(12) United States Patent
Abu Qahouq

(10) Patent No.: US 10,468,980 B2
(45) Date of Patent: Nov. 5, 2019

(54) SYSTEMS, METHODS, AND DEVICES FOR SIMULTANEOUS WIRELESS AND WIRED POWER TRANSFER

(71) Applicant: THE BOARD OF TRUSTEES OF THE UNIVERSITY OF ALABAMA, Tuscaloosa, AL (US)

(72) Inventor: Jaber A. Abu Qahouq, Tuscaloosa, AL (US)

(73) Assignee: THE BOARD OF TRUSTEES OF THE UNIVERSITY OF ALABAMA, Tuscaloosa, AL (US)

( * ) Notice: Subject to any disclaimer, the term of this patent is extended or adjusted under 35 U.S.C. 154(b) by 208 days.

(21) Appl. No.: 15/637,049

(22) Filed: Jun. 29, 2017

(65) Prior Publication Data

US 2018/0006555 A1 Jan. 4, 2018

Related U.S. Application Data

(60) Provisional application No. 62/356,859, filed on Jun. 30, 2016.

(51) Int. Cl.
| | |
|---|---|
| *H02M 1/14* | (2006.01) |
| *H02M 3/155* | (2006.01) |
| *H02J 50/10* | (2016.01) |
| *H02J 7/00* | (2006.01) |
| *H02J 7/02* | (2016.01) |
| *H02M 3/158* | (2006.01) |
| *G06F 1/26* | (2006.01) |

(Continued)

(52) U.S. Cl.
CPC .............. *H02M 3/155* (2013.01); *G06F 1/26* (2013.01); *H02J 7/0052* (2013.01); *H02J 7/025* (2013.01); *H02J 50/10* (2016.02); *H02M 1/14* (2013.01); *H02M 3/158* (2013.01); *H02M 3/1582* (2013.01); *H02J 1/06* (2013.01); *H02M 2001/008* (2013.01)

(58) Field of Classification Search
CPC ........ H02M 3/155; H02M 3/158; H02M 1/14; H02M 2001/008; H02M 3/1582; G06F 1/26; H02J 7/025; H02J 50/10; H02J 7/0052; H02J 1/06; H02J 7/04
See application file for complete search history.

(56) References Cited

U.S. PATENT DOCUMENTS 8,278,784 B2 * 10/2012 Cook .................... H01Q 1/2225
307/149

* cited by examiner

*Primary Examiner* — Jung Kim
(74) *Attorney, Agent, or Firm* — Meunier Carlin & Curfman LLC

(57) ABSTRACT

Systems, devices, controllers, and methods for simultaneous transfer of wireless and wired power are described herein. An example device can include a power converter or inverter circuit having a switch, a power inductor, a wired power output loop for delivering wired power to a wired load, and a wireless power output loop for delivering wireless power to a wireless load. The wired power can be a function of a direct current (DC) component of a current of the power inductor, and the wireless power can be a function of an induced and/or switching alternating current (AC) ripple component of the current of the power inductor. In addition, the device can include a controller operably coupled to the power converter or inverter circuit. The controller can include a processing unit and a memory and can be configured to independently regulate the wired power and the wireless power.

15 Claims, 24 Drawing Sheets

(51) Int. Cl.
*H02J 1/06* (2006.01)
*H02M 1/00* (2006.01)

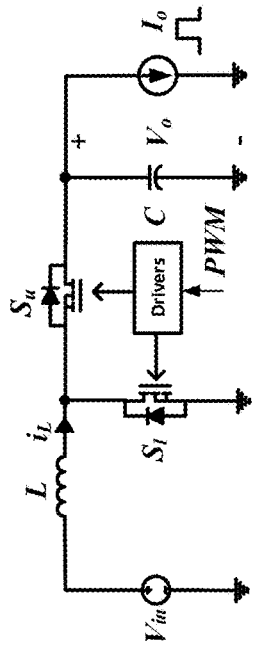
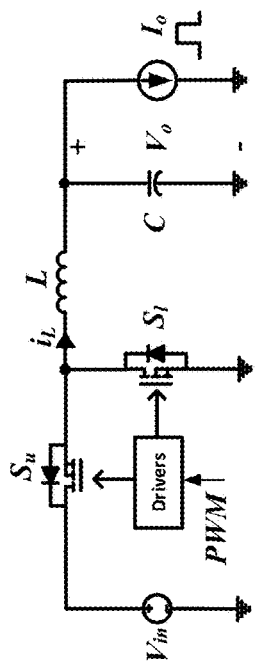
FIG. 1
FIG. 2

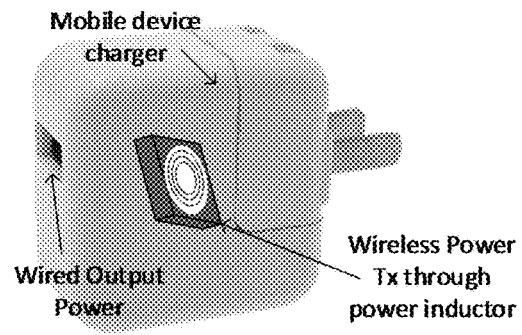
FIG. 26
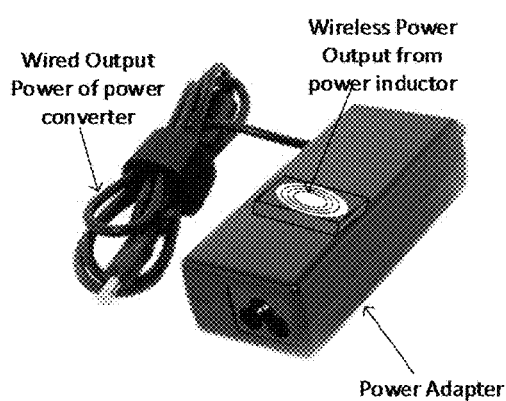
FIG. 27
FIG. 28
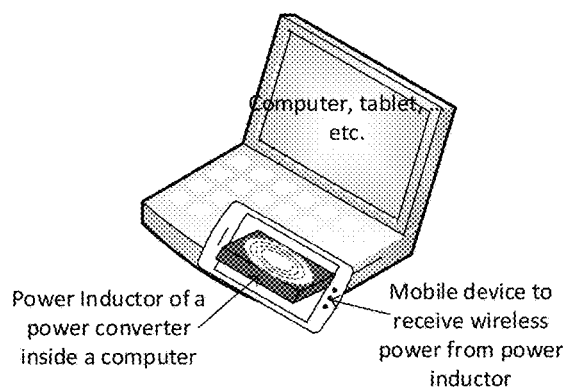

SYSTEMS, METHODS, AND DEVICES FOR SIMULTANEOUS WIRELESS AND WIRED POWER TRANSFER

CROSS-REFERENCE TO RELATED APPLICATIONS

This application claims the benefit of U.S. Provisional Patent Application No. 62/356,859, filed on Jun. 30, 2016, entitled "SYSTEMS, METHODS, AND DEVICES FOR SIMULTANEOUS WIRELESS AND WIRED POWER TRANSFER," the disclosure of which is expressly incorporated herein by reference in its entirety.

BACKGROUND

Wireless power transfer (WPT) is the transmission of energy or power from a source to a load without a wire. WPT can be used in a wide variety of applications, for example, to directly power electronic devices and/or recharge batteries. A conventional inductive or resonant inductive WPT system normally includes a transmitter (Tx) side circuit, a Tx coil, a receiver (Rx) coil, and Rx side electronics/load. The major part of the Tx side circuit is the DC-AC inverter/power amplifier such as full-bridge/half-bridge inverter and class-E power amplifier. The generated high frequency AC drives the Tx coil to create oscillating magnetic field in the proximity of the Tx coil. Energy is then delivered to Rx coil through this oscillating magnetic field to realize WPT. The Tx side circuitry and Tx coil are essential parts in conventional WPT system but they are bulky in size and weight.

On the other hand, wired power transmission and regulation can be done using power regulation circuits such as DC-DC, AC-DC, and DC-AC power converters and inverters. Switching power converters and inverters usually include one or more power inductors. Taking a switching DC-DC power converters as an example, its power inductor carries a desired DC current to deliver energy to the load but also there is a natural oscillating current AC ripple component imposed on the DC current component. The current AC ripple components is usually undesired and design goal is to reduce it. This AC ripple current component causes additional loss in the power converter and result in electromagnetic interference.

The use of this current AC ripple component has not been explored and is also considered a disadvantage. As described above, state-of-the-art circuits and controllers used for wireless power transmission are different from the state-of-the-art circuits and controllers used for wired power transmission.

SUMMARY

Systems, devices, and methods are described herein that facilitate using a power converter circuit or power inverter circuit to transfer and regulate power both wirelessly and wired at the same time (i.e., simultaneously) using the same circuit, which also reduces size and cost and improves efficiency. It is possible to use the same power converter or inverter circuit (e.g., the circuit used for conventional wired power transmission and regulation described above) to deliver both wireless power and wired power because current flowing through a power inductor includes a direct current (DC) component and an alternating current (AC) ripple component. This AC ripple component can be an induced ripple as described herein, or the natural switching ripple of the converter or inverter circuit as described herein, or both the induced and natural switching ripple as described herein. The DC component is used to deliver power to the wired output, and the AC ripple component is used to deliver power to the wireless output. It should be understood that the AC ripple component generates a magnetic field, which can be used for wireless power transmission. Therefore, there is no need for additional wireless power transmitter circuits. The systems, devices, and methods described herein use control techniques that allow for voltage, current, and/or power regulation to each of the wireless and wired outputs separately. Therefore, there is no need for two separate controllers for separate circuits.

An example device for simultaneous transfer of wireless and wired power is described herein. The device can include a power converter or inverter circuit having a switch, a power inductor, a wired power output loop for delivering wired power to a wired load, and a wireless power output loop for delivering wireless power to a wireless load. The wired power can be a function of a direct current (DC) component of a current of the power inductor, and the wireless power can be a function of an alternating current (AC) ripple component of the current of the power inductor. In addition, the device can include a controller operably coupled to the power converter or inverter circuit. The controller can include a processing unit and a memory and can be configured to independently regulate the wired power and the wireless power.

Additionally, the controller can use a respective closed control loop for regulating each of the wired power and the wireless power.

Alternatively or additionally, the controller can be configured to independently regulate the wired power and the wireless power by altering at least one of a signal that controls a duty cycle or a switching frequency of the switch.

In some implementations, the controller can be configured to regulate the wireless power by perturbing a signal that controls the duty cycle of the switch. This perturbation can cause a change in the AC ripple component of the current of the power inductor, which causes varying magnetic field for wireless power transmission. This is sometimes referred to herein as induced AC ripple component. For example, to perturb the signal that controls the duty cycle of the switch, the controller can introduce a time-varying perturbation to the signal. The time-varying perturbation can be a sinusoidal or non-sinusoidal waveform. Additionally, the controller can be configured to regulate the wireless power by adjusting a peak-to-peak value or frequency of the time-varying perturbation.

In some implementations, the controller can be configured to regulate the wireless power by adjusting a frequency of a signal that controls the switching frequency of the switch. This adjustment can cause a change in the AC ripple component of the current of the power inductor, which causes varying magnetic field for wireless power transmission. This is sometimes referred to herein as natural switching AC ripple component.

Alternatively or additionally, the controller can be configured to regulate the wired power by adjusting a signal that controls the duty cycle of the switch.

Alternatively or additionally, the power converter or inverter circuit can include pulse width modulation (PWM) generator operably coupled to the controller. The PWM generator can be configured to transmit control signals to the switch of the power converter or inverter circuit.

Alternatively or additionally, the power inductor can be a variable inductor. In addition, the controller can be configured to regulate the wireless power by adjusting an inductance value of the variable inductor. This adjustment can cause a change in the AC ripple component of the current of the power inductor, which causes varying magnetic field for wireless power transmission.

Alternatively or additionally, the device can further include a plurality of power converter or inverter circuits, where respective wired power output loops or respective wireless power output loops of the power converter or inverter circuits are connected in series or parallel.

Alternatively or additionally, the power converter or inverter circuit can include a plurality of power inductors and a plurality of wireless power output loops, where each wireless power output loop can be configured to deliver wireless power to a wireless load. According to this implementation, wireless power delivered to each wireless load can be a function of an AC ripple component of the current of a respective power inductor.

Alternatively or additionally, the device can include a wireless power receiver circuit operably coupled to the wireless power output loop. The wireless power receiver circuit can be configured to receive the wireless power and convert the wireless power to at least one of radiofrequency (RF) energy, sound, or light. For example, the wireless power receiver circuit can include at least one of an antenna, a piezoelectric element, or a light-emitting element. Optionally, the wireless power receiver circuit can include a multi-coil antenna. Additionally, the controller can be configured to switch between coils of the multi-coil antenna.

Alternatively or additionally, the device can be a charging adapter, a power adapter, or a computing device.

Alternatively or additionally, a winding of the power inductor can be at least one of copper, gold, graphene, carbon nanotubes, a superconductor material, a piezoelectric material, or an RF element.

Alternatively or additionally, the power inductor can include a magnetic sheet or core. Alternatively or additionally, the device can include a housing. Additionally, the housing can have a recess or slot configured to receive a power inductor shielding element.

Alternatively or additionally, the device can include a power source. Alternatively or additionally, the controller can be further configured to control a bidirectional flow of the wired power or the wireless power between the power source and the wired power output loop or the wireless power output loop. Alternatively or additionally, the controller can be configured to control the bidirectional flow of the wired power or the wireless power to maximize efficiency of the device. Alternatively or additionally, the controller can be configured to control the bidirectional flow of the wired power or the wireless power to perform maximum power point tracking.

An example method for simultaneous transfer of wireless and wired power is also described herein. The method can include regulating wired power delivered to a wired load via a wired power output loop of a power converter or inverter circuit, and regulating wireless power delivered to a wireless load via a wireless power output loop of the power converter or inverter circuit. The wired power can be a function of a direct current (DC) component of a current of the power inductor, and the wireless power can be a function of an alternating current (AC) ripple component of the current of the power inductor. Additionally, the wired power and the wireless power can be regulated independently of one another.

Additionally, the wired power and the wireless power can be regulated independently of one another by altering at least one of a signal that controls a duty cycle or a switching frequency of a switch of the power converter or inverter circuit.

In some implementation, the method can include perturbing a signal that controls the duty cycle of the switch. This perturbation can cause a change in the AC ripple component of the current of the power inductor, which causes varying magnetic field for wireless power transmission. This is sometimes referred to herein as induced AC ripple component. For example, to perturb the signal that controls the duty cycle of the switch, the method can include introducing a time-varying perturbation to the signal. The time-varying perturbation can be a sinusoidal or non-sinusoidal waveform. Additionally, the method can include adjusting a peak-to-peak value or frequency of the time-varying perturbation.

Alternatively or additionally, the method can include regulating wireless power delivered to a wireless load via a plurality of wireless power output loops of respective power converter or inverter circuits, where the respective perturbations of signals that control the respective duty cycles of the switches of the power converter or inverter circuits are phase shifted relative to each other.

In some implementation, the method can include adjusting a frequency of a signal that controls the switching frequency of the switch. This adjustment causes a change in the AC ripple component of the current of the power inductor, which causes varying magnetic field for wireless power transmission. This is sometimes referred to herein as natural switching AC ripple component.

In some implementations, the method can include adjusting an inductance value of the power inductor. This adjustment causes a change in the AC ripple component of the current of the power inductor, which causes varying magnetic field for wireless power transmission.

Alternatively or additionally, the power converter or inverter circuit can include a plurality of power inductors and a plurality of wireless power output loops, where each wireless power output loop can be configured to deliver wireless power to a wireless load. According to this implementation, wireless power delivered to each wireless load can be a function of an AC ripple component of the current of a respective power inductor.

Alternatively or additionally, the method can further include converting the wireless power to at least one of radiofrequency (RF) energy, sound, or light, and transmitting the at least one of RF energy, sound, or light.

An example system for simultaneous transfer of wireless and wired power is also described herein. The system can include a wireless powered device and a power transfer device that is inductively coupled with the wireless power receiving device. The power transfer device can include a power converter or inverter circuit having a switch, a power inductor, a wired power output loop for delivering wired power to a wired load, and a wireless power output loop for delivering wireless power to the wireless powered device. The wired power can be a function of a direct current (DC) component of a current of the power inductor, and the wireless power can be a function of an alternating current (AC) ripple component of the current of the power inductor.

Additionally, the power transfer device can include a controller operably coupled to the power converter or inverter circuit. The controller can include a processing unit and a memory and can be configured to independently regulate the wired power and the wireless power.

Another example system for simultaneous transfer of wireless and wired power is described herein. The system can include a first device and a second device, where the first and second devices are configured as any of the power transfer devices described herein. The system can also include a wireless power link, where the first device and the second device are inductively coupled through the wireless power link. The respective wireless power delivered to each wireless load can be a function of the AC ripple component of the respective current of the respective power inductor of each of the first device and the second device.

Additionally, each of the first device and the second device can include an active bridge circuit operably coupled to the respective power converter or inverter circuit. As described herein, the direction of the power flow can be a function of which active bridge circuit is ON or OFF.

Alternatively or additionally, one or more switches of the respective active bridge circuit of the first device or the second device can be impeded to control a bidirectional flow of wireless power between the first device and the second device through the wireless power link.

Alternatively or additionally, at least one of the first device or the second devices can include a power source.

Alternatively or additionally, the first device and the second device can be mobile computing devices.

Alternatively or additionally, the wireless power can be delivered through the respective wireless power output loops of the respective power converter or inverter circuits of the first and second devices regardless of the bidirectional flow of the wireless power between the first device and the second device.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 1 illustrates example power converter circuits.

FIG. 2 illustrates an example power converter or inverter circuit according to implementations described herein.

FIG. 26 illustrates an example mobile device charger according to implementations described herein.

FIG. 27 illustrates an example power adapter according to implementations described herein.

FIG. 28 illustrates an example laptop computer according to implementations described herein.

DETAILED DESCRIPTION

Figure 3:
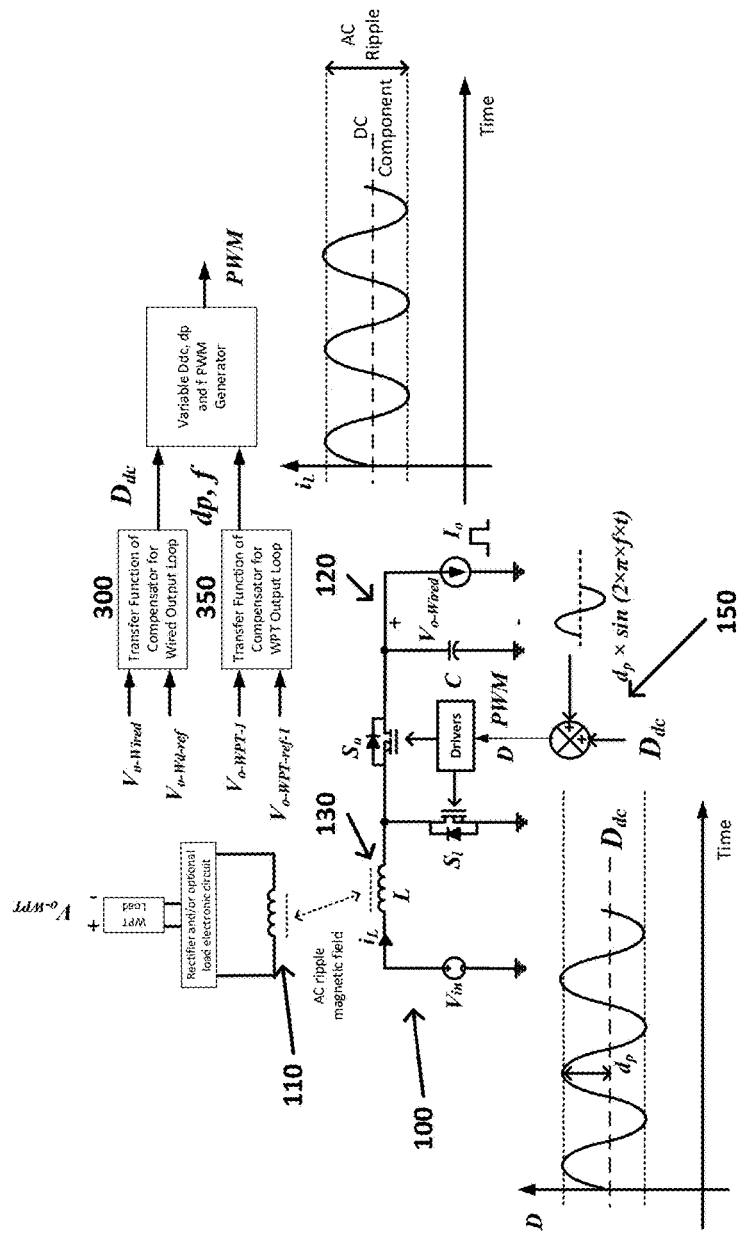
FIG. 3 illustrates a power converter or inverter circuit and technique for independent regulation of wired and wireless power outputs.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for independent regulation of wireless and wired power, it will become evident to those skilled in the art that the implementations are not limited thereto.

Systems, devices, and methods are described herein that facilitate using a power converter circuit or power inverter circuit to transfer and regulate power both wirelessly and wired at the same time (i.e., simultaneously) using the same circuit, which also reduces size and cost. It is possible to use the same power converter or inverter circuit to deliver both wireless power and wired power because current flowing through a power inductor includes a direct current (DC) component and an alternating current (AC) ripple component. This AC ripple component can be an induced ripple as described herein, or can be the natural switching ripple of the converter or inverter circuit described herein, or can be both the induced and natural switching ripple as described herein. The DC component is used to deliver power to the wired output (e.g., the wired power output loop described herein), and the AC ripple component is used to deliver power to the wireless output (e.g., the wireless power output loop). It should be understood that the AC ripple component generates magnetic field, which can be used for wireless power transmission. Therefore, there is no need for additional wireless power transmitter circuits. The systems, devices, and methods described herein use control techniques that allow for voltage, current, and/or power regulation to each of the wireless and wired outputs separately. Therefore, there is no need for two separate controllers for separate circuits.

Referring now to FIG. 1, example power converter circuits are shown. For example, a buck power converter circuit is shown on the left hand side of FIG. 1, and a boost power converter circuit is shown on the right hand side of FIG. 1. Each power converter circuit includes a power inductor L. Power converter circuits (as well as power inverter circuits) are well known in the art. It should be understood that the systems, devices, and methods described herein can be implemented using power converter or inverter circuits other than buck and boost power converters, which are provided as examples only. By taking an existing power converter or inverter circuit, such as the example circuits shown in FIG. 1 for example, and adding an additional winding 110 (e.g., as part of a wireless power receiver Rx) as in shown in FIG. 2, the power inductor L and its related converter/inverter switches can be used to supply both wired power to a wired power output while at the same time supplying wireless power to another output, i.e., a wireless power output loop. This can be accomplished without adding any components to the power converter or inverter circuit and without the need for an additional wireless power transmitter (Tx) circuit and controller.

Referring now to FIG. 2, an example power converter or inverter circuit 100 is shown. The example power converter or inverter circuit 100 can be used in any of the systems, devices, or methods for simultaneous transfer of wireless and wired power described herein. The power converter or inverter circuit 100 can include a switch $S_u$ (upper switch) or $S_l$ (lower switch), a power inductor L, a wired power output loop 120 for delivering wired power to a wired load 125 (e.g., delivering $V_{o\text{-}wired}$, $I_{o\text{-}1}$), and a wireless power output loop 130 for delivering wireless power to a wireless load 135 (e.g., delivering $V_{o\text{-}WPT}$). This disclosure contemplates that a winding of the power inductor L can be at least one of copper, gold, graphene, carbon nanotubes, a superconductor material, a piezoelectric material, or an RF element. In addition, this disclosure contemplates that the power inductor L can include a magnetic sheet or core. The magnetic sheet or core can improve inductance and coupling between the power inductor acting as a wireless power transmitter and a wireless power receiver (e.g., the wireless powered device described herein). It should also be understood that the wireless power receiver can include a magnetic sheet or core as well. As described above, current (i.e., current $i_L$) flowing through the power inductor L includes a DC component and an AC ripple component. The wired power can be a function of the DC component, and the wireless power can be a function of an AC ripple component. As described herein, the AC ripple component can be induced AC ripple component (e.g., described with respect to FIG. 3), or the naturally existing switching AC ripple component (e.g., described with respect to FIG. 6), or both at the same time. It should be understood that the AC ripple component will be present when current (i.e., current $i_L$) flows through the power inductor L regardless of whether a wireless load (e.g., wireless load 135) is present or not present. Optionally, this disclosure contemplates that the wired load and/or wireless load can be a battery or other wireless powered device (e.g., an electronic device).

Figure 30:
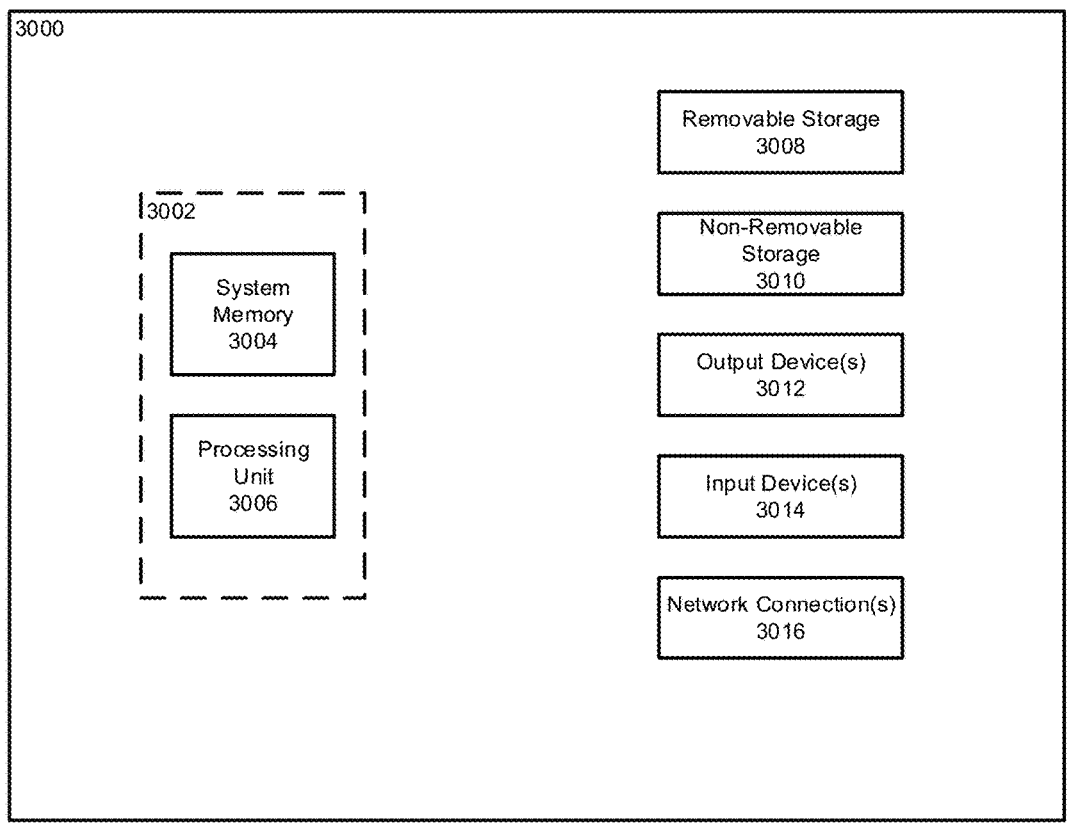
FIG. 30 illustrates an example computing device.

In addition, the power converter or inverter circuit 100 can be operably coupled to a controller 150. The power converter or inverter circuit 100 and the controller 150 can be operably coupled through one or more communication links. This disclosure contemplates the communication links are any suitable communication link. For example, a communication link may be implemented by any medium that facilitates data exchange between the power converter or inverter circuit 100 and the controller 150 including, but not limited to, wired, wireless and optical links. The controller 150 can include a processing unit and a memory (e.g., a computing device 3000 as shown in FIG. 30), and the controller 150 can be configured to independently regulate the wired power and the wireless power. It should be understood that the controller 150 can be configured to regulate at least one of a voltage, a current, or a power of the wired power independently of regulating at least one of a voltage, a current, or a power of the wireless power.

The power converter or inverter circuit 100 can include pulse width modulation (PWM) generator operably coupled to the controller 150. The PWM generator can be configured to transmit control signals to drive the switches $S_u$ and $S_l$. In addition, a power source (e.g., $V_{in}$) can be operably coupled to the power converter or inverter circuit 100. The power source can be a battery, a solar cell, a fuel cell, a thermal cell, including combinations thereof. It can also include any power source type that is rechargeable or not rechargeable. It should be understood that the power source can supply power to the power converter or inverter circuit 100 and can also receive power from the power converter or inverter circuits, its wired output, and/or its wireless output. When the power source receives power from its wired and/or wireless outputs, it should be understood that the wired and/or wireless outputs act as inputs to charge the power source.

As described herein, the controller 150 can be configured to independently regulate the wired power and the wireless power by altering at least one of (i) a signal that controls a duty cycle of the switch $S_u$ or $S_l$, or (ii) a signal that controls a switching frequency of the switch $S_u$ or $S_l$. Referring now to FIG. 3, a technique for regulating wireless power by perturbing a signal that controls the duty cycle of the switch $S_u$ or $S_l$ is described. This perturbation can cause a change in the induced AC ripple component of the current of the power inductor L, which causes varying magnetic field for wireless power transmission through the additional winding 110 (while maintaining a DC component as required by the wired output or load). This is sometimes referred to herein as the induced perturbation ripple technique. It should be understood that the controller 150 can be configured to regulate the wired power by adjusting a signal that controls the duty cycle of the switch $S_u$ or $S_l$. For example, the wired power of the power converter or inverter circuit 100 can be well regulated by controlling the duty cycle of switch $S_u$ (i.e., the upper switch). The duty cycle of switch $S_u$ can be defined by D=ton/Ts, which is the ratio between the upper switch ON time and the switching period (i.e., upper switch ON time plus upper switch OFF time). Additionally, a DC value of the duty cycle control signal $D_{dc}$ shown in FIG. 3 can be used to regulate the duty cycle of switch $S_u$ and therefore also regulate the wired power delivered through the wired power output loop 120. As shown in FIG. 3, a first closed control loop 300 can be implemented for independent regulation of the wired power delivered through the wired power output loop 120, and a second closed control loop 350 can be implemented to control the wireless power delivered through the wireless power output loop 130. To perturb duty cycle control signal $D_{dc}$, the controller 150 can introduce a time-varying perturbation to duty cycle control signal $D_{dc}$. The time-varying perturbation can be a sinusoidal or non-sinusoidal waveform including, but not limited to, a square wave, sawtooth wave, or other non-sinusoidal waveform. For example, as shown in FIG. 3, a small duty cycle sinusoidal perturbation dp×sin (2×π×f×t) can be added to duty cycle control signal $D_{dc}$ in order to generate additional induced AC ripple in the power inductor L, which causes varying magnetic field for wireless power transmission. The wireless power can be regulated by adjusting a peak-to-peak value (i.e., dp in FIG. 3) and/or frequency of the time-varying perturbation.

Figure 4:
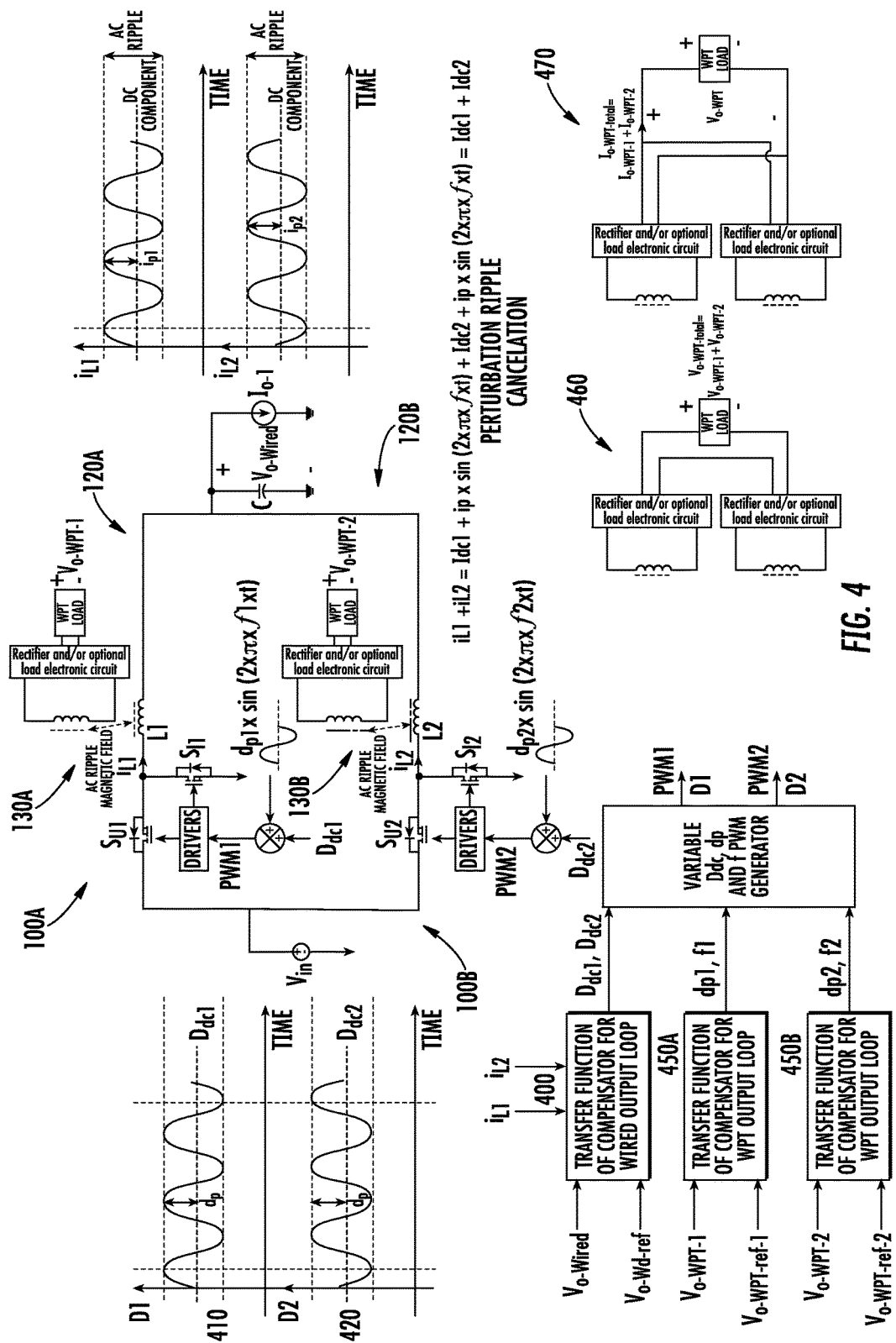
FIG. 4 illustrates a power converter or inverter circuit and technique for canceling the effect of perturbation on the wired power output while transmitting power to the wireless power output using the induced AC perturbation ripple.
Figure 5:
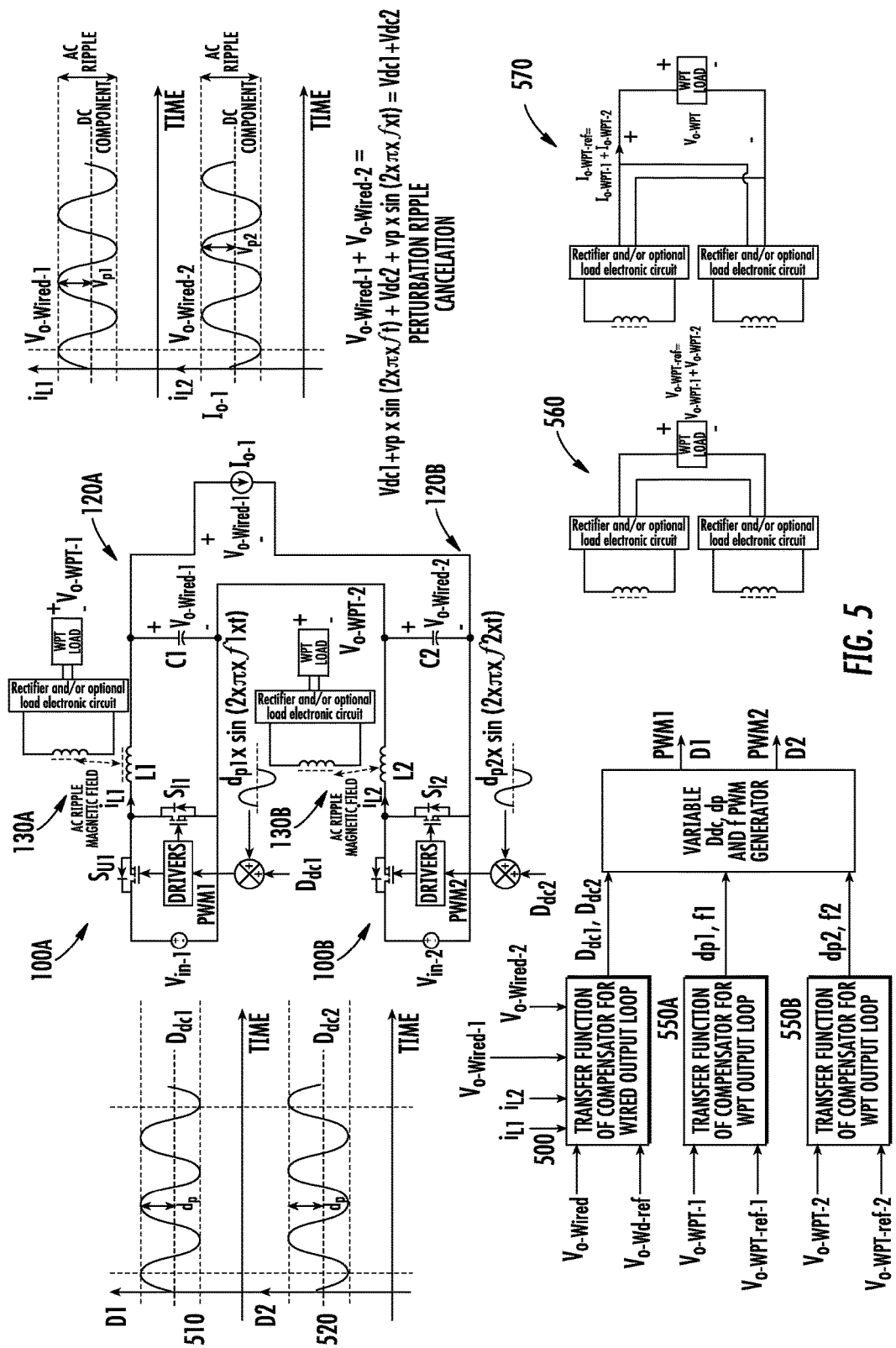
FIG. 5 illustrates a power converter or inverter circuit and technique for canceling the effect of perturbation on the wired power output while transmitting power to the wireless power output using the induced AC perturbation ripple.

Referring now to FIGS. 4 and 5, a technique for regulating wireless power by perturbing a signal that controls the duty cycle of the switch $S_u$ or $S_l$ is described. The technique described with respect to FIGS. 4 and 5 can be used to cancel the effect of the perturbation on the wired power output(s) while using the induced AC ripple to transmit wireless power. For example, in order to cancel the effect of the perturbation on the output voltage ripple at the wired power output, a plurality of power converter or inverter circuits 100A or 100B are connected either in parallel (i.e., FIG. 4) or in series (i.e., FIG. 5). It should be understood that the power converter or inverter circuits of FIGS. 4 and 5 share many of the same features as the power converter or inverter circuit 100 of FIG. 2. Accordingly, some features of the power converter or inverter circuits of FIGS. 4 and 5 are not described in further detail below. Additionally, although two power converter or inverter circuits are shown as examples in FIGS. 4 and 5, it should be understood that more than two power converter or inverter circuits can be used as described below.

As shown in FIG. 4, respective wired power output loops 120A and 120B of the power converter or inverter circuits 100A and 100B are connected in parallel, while in FIG. 5, respective wired power output loops 120A and 120B of the power converter or inverter circuits 100A and 100B are connected in series. In each power converter or inverter circuit, the respective sinusoidal perturbation signals (i.e., signals 410 and 420 in FIG. 4 and signals 510 and 520 in FIG. 5) are phase shifted relative to each other such that the net perturbation ripple is reduced, e.g., cancelled to zero. In FIGS. 4 and 5, the phase shift between the two perturbation signals is 180 degrees (i.e., 360/N, where N=2). This disclosure contemplates that more than two power converter or inverter circuits can be connected (e.g., N>2). For example, if three power converter or inverter circuits are used, phase shift can be 120 degrees (i.e., 360/N, where N=3).

Similar to above, closed control loops can be implemented for independent regulation of the wired and wireless power outputs. For example, the wireless output loops 130A and 130B from each of the power inductors can be left independent or disconnected such that each of the wireless output loops 130A and 130B is regulated by adjusting dp1 and dp2 values, respectively. In other words, a first closed control loop (e.g., 400 or 500 in FIGS. 4 and 5, respectively) can be implemented for independent regulation of the wired power delivered through the wired power output loop, a second closed control loop (e.g., 450A or 550A in FIGS. 4 and 5, respectively) can be implemented to control the wireless power delivered through the wireless power output loop 130A, and a third closed control loop (e.g., 450B or 550B in FIGS. 4 and 5, respectively) can be implemented to control the wireless power delivered through the wireless power output loop 130B. Alternatively, the wireless output loops 130A and 130B can be connected either in series (e.g., as shown by 460 or 560 in FIGS. 4 and 5, respectively) or in parallel (e.g., as shown by 470 or 570 in FIGS. 4 and 5, respectively) to yield a single wireless power output with higher power/current/voltage.

Figure 6:
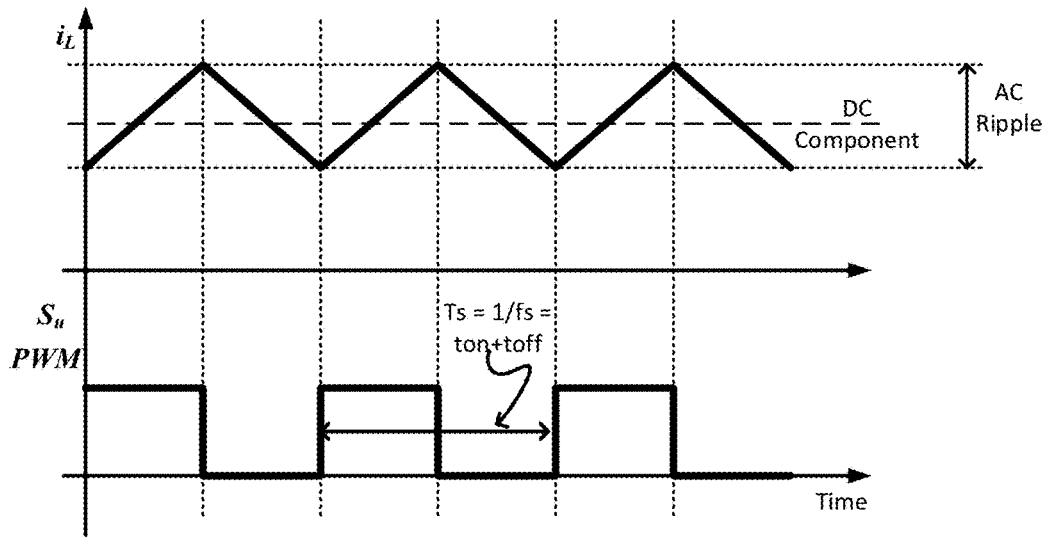
FIG. 6 illustrates another technique for independent regulation of wired and wireless power.
Figure 6:
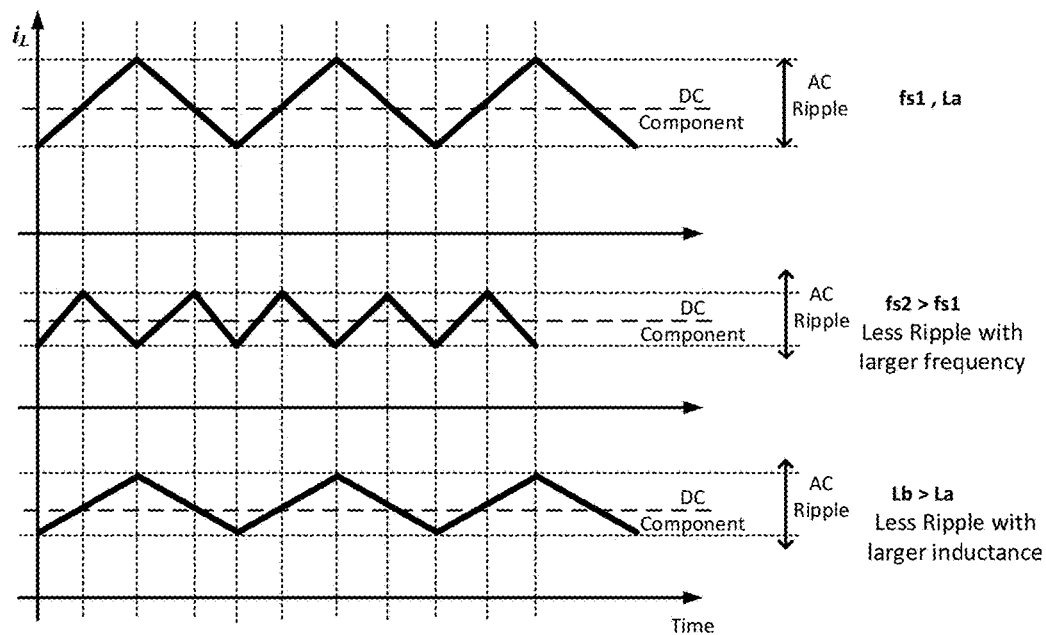

Referring now to FIG. 6, a technique for regulating wireless power by adjusting a frequency of a signal that controls the switching frequency of the switch $S_u$ or $S_l$ is described. This perturbation can cause a change in the natural switching AC ripple component of the current of the power inductor L, which causes varying magnetic field for wireless power transmission through the additional winding. This is sometimes referred to herein as the natural switching ripple technique. As shown in FIG. 6, the basic concept is that the wired power output of the power converter or inverter circuit (e.g., power converter or inverter circuit 100 of FIG. 2) can be well regulated by controlling the duty cycle of switch $S_u$ (i.e., the upper switch). As described above, the duty cycle of switch $S_u$ can be defined by D=ton/Ts, which is the ratio between the upper switch ON time and the switching period (i.e., upper switch ON time plus upper switch OFF time). As described herein, the wireless power output can be regulated by adjusting or varying the magnitude of the AC ripple of the current of the power inductor by controlling the switching frequency (e.g., fs=1/Ts) of the switches (e.g., switches $S_u$ and $S_l$ in the power converter or inverter circuit 100 of FIG. 2). In some of the power converter or inverter circuits such as the circuits shown in FIG. 1, for example, adjusting the switching frequency affects the wireless power output but does not affect the regulation of the wired power output. For example, as shown in FIG. 6, by increasing the switching frequency (i.e., fs2>fs1), it is possible to decrease the magnitude of the AC ripple component, which decreases the wireless power output. Conversely, by decreasing the switching frequency, it is possible to increase the magnitude of the AC ripple component, which increases the wireless power output.

Alternatively or additionally, the power inductor L can be a variable inductor. It is also possible to regulate the wireless power by adjusting an inductance value of the variable inductor. This adjustment can cause a change in the AC ripple component of the current of the power inductor L, which causes varying magnetic field for wireless power transmission. For example, as shown in FIG. 6, by increasing the inductance value (i.e., Lb>La), it is possible to decrease the magnitude of the AC ripple component, which decreases the wireless power output. Conversely, by decreasing the inductance value, it is possible to increase the magnitude of the AC ripple component, which increases the wireless power output.

Referring again to FIG. 2, the controller 150 can be configured to control a bidirectional flow of the wired power or the wireless power between the power source (e.g., a battery, a solar cell, a fuel cell, a thermal cell, etc.) and the wired power output loop 120 and/or the wireless power output loop 130. As described above, the wired load 125 and/or wireless load 135 can be a battery or other powered device. This disclosure contemplates that the controller 150 can be configured to control the flow of energy or power in any direction, e.g., from the power source to the wired and wireless power output loops 120 and 130 or from one of the power output loops to the power source and the other power output loop. For example, in one mode of operation, energy or power can be supplied from a power source to a battery (or batteries) charging at one (or both) of the wired or wireless power output loop. While in another mode of operation, the battery (or both batteries) can supply energy or power. Alternatively or additionally, the controller 150 can be configured to control the bidirectional flow of the wired power or the wireless power to maximize efficiency. Alternatively or additionally, the controller 150 can be configured to control the bidirectional flow of the wired power or the wireless power to perform maximum power point tracking (e.g., maximum power point tracking can be performed when the power source is a solar cell or fuel cell).

Figure 7:
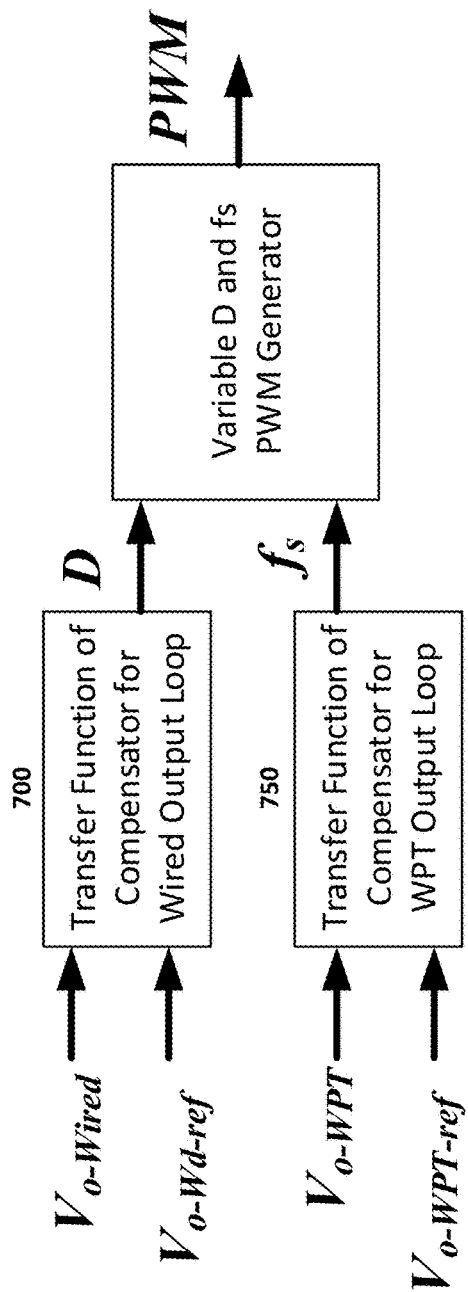
FIG. 7 illustrates a functional block diagram of an example controller according to implementations described herein.

Referring now to FIG. 7, a functional block diagram of an example controller is shown. This controller can be used for the natural switching ripple control technique. As shown in FIG. 7, a first closed control loop 700 can be implemented for independent regulation of the wired power delivered through the wired power output loop (i.e., duty cycle control), and a second closed control loop 750 can be implemented to control the wireless power delivered through the wireless power output loop (i.e., switching frequency control). By controlling both the switching frequency and the duty cycle by using two closed loops, both the wired and wireless power outputs can be regulated independently without cross regulation between the two outputs.

Figure 8:
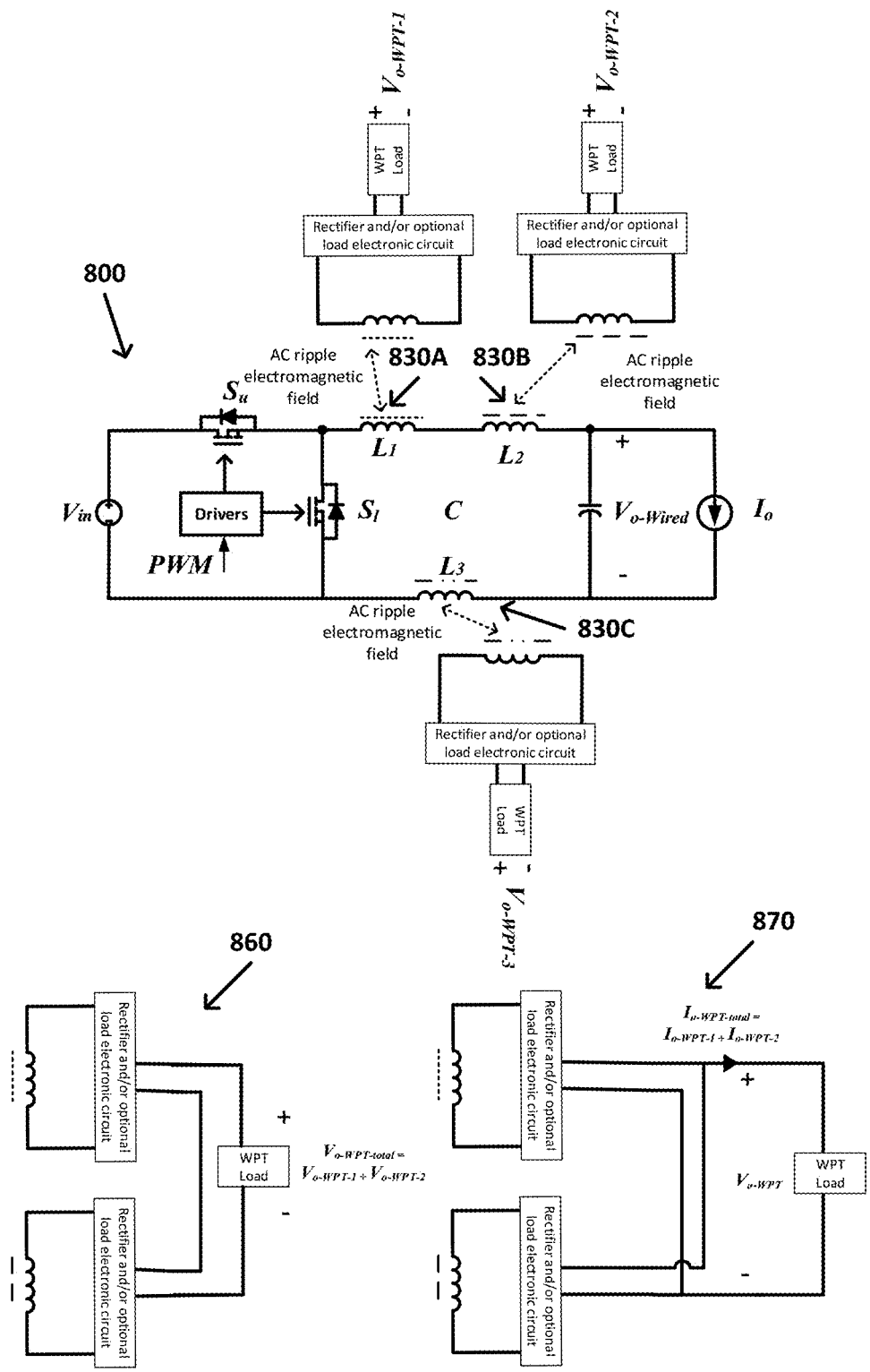
FIG. 8 illustrates another example power converter or inverter circuit according to implementations described herein.

Referring now to FIG. 8, a power converter or inverter circuit 800 according to another implementation is shown. It should be understood that the power converter or inverter circuit 800 of FIG. 8 shares many of the same features as the power converter or inverter circuit 100 of FIG. 2. Accordingly, some features of the power converter or inverter circuit 800 of FIG. 8 are not described in further detail below. As shown in FIG. 8, the power inductor can be split to a plurality of power inductors $L_1$, $L_2$, and $L_3$ and a plurality of wireless power output loops 830A, 830B, and 830C, where each wireless power output loop can be configured to deliver wireless power to a wireless load. According to this implementation, wireless power can be a function of an induced AC ripple component of the current of the respective power inductors $L_1$, $L_2$, and $L_3$, or a function of the natural switching AC ripple component, or a function of both the induced and natural switching AC ripple components. The wireless output loops can be left independent or disconnected to supply different wireless loads, respectively. Alternatively, the wireless output loops can be connected either in series (e.g., as shown by 860 in FIG. 8) or in parallel (e.g., as shown by 870 in FIG. 8) to yield a single wireless power output with higher power/current/voltage.

Figure 9:
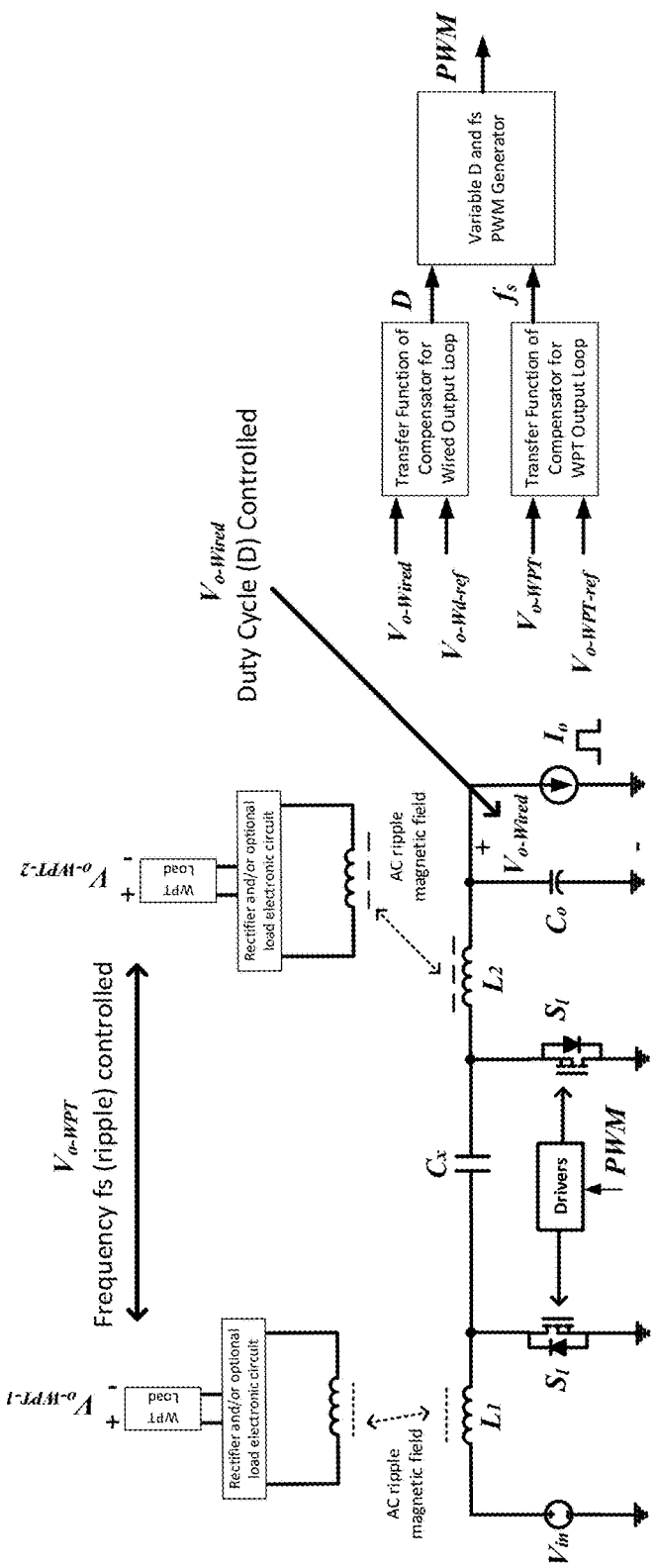
FIG. 9 illustrates a non-isolated Cuk power converter circuit according to yet another implementation described herein.
Figure 10:
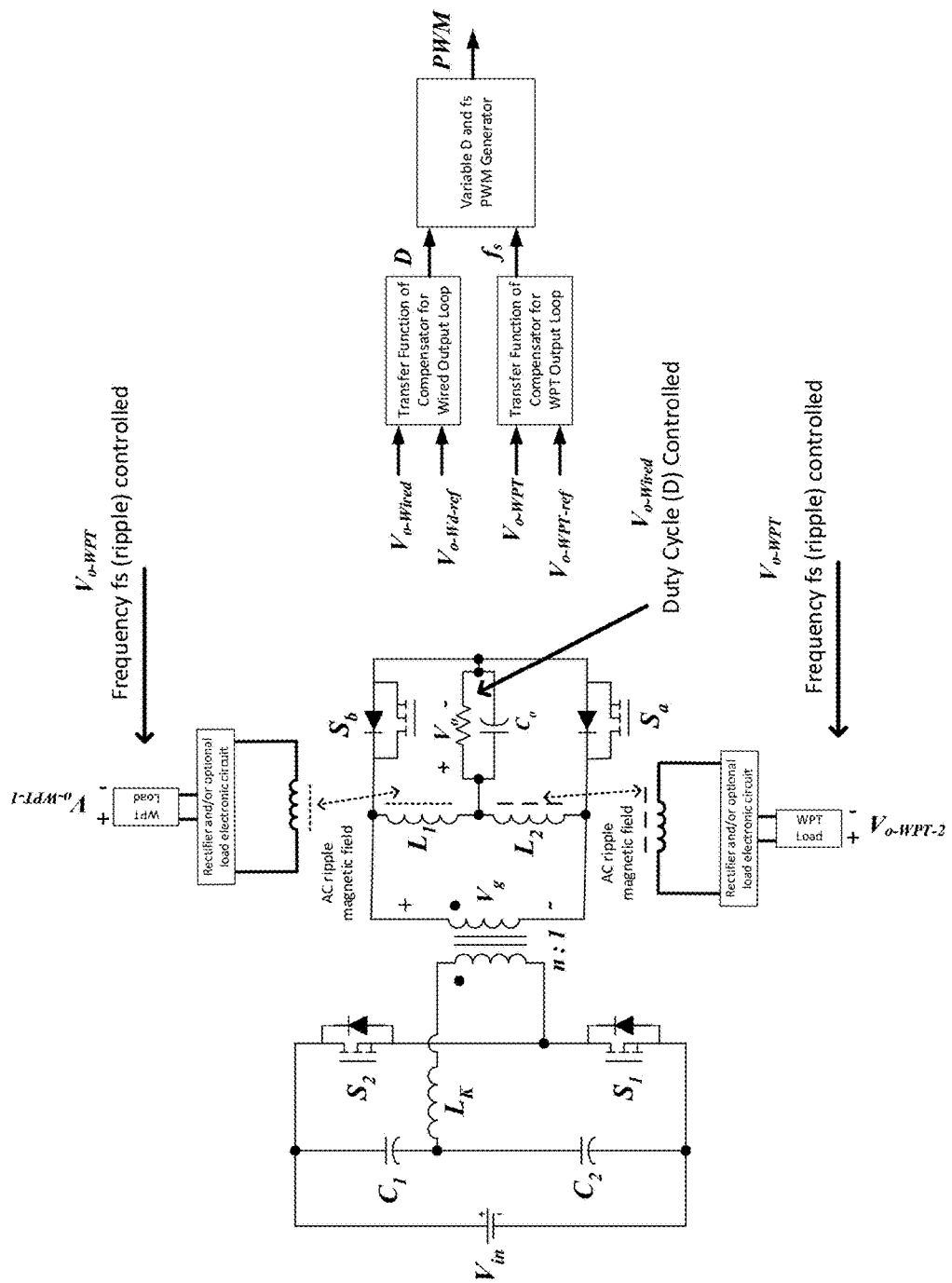
FIG. 10 illustrates a half-bridge current-double power converter circuit according to yet another implementation described herein.

Referring now to FIGS. 9 and 10, power converter or inverter circuits according to other implementations are shown. It should be understood that the power converter or inverter circuits of FIGS. 9 and 10 share many of the same features as the power converter or inverter circuit 100 of FIG. 2. Accordingly, some features of the power converter or inverter circuits of FIGS. 9 and 10 are not described in further detail below. Each of the power converter or inverter circuits of FIGS. 9 and 10 include more than one power inductor can be used to realize several wired and wireless outputs based on the natural switching ripple concept described with respect to FIG. 6. FIG. 9 illustrates a non-isolated Cuk power converter, and FIG. 10 illustrates a half-bridge current-double power converter. Both power converters can implement a controller according to FIG. 7 to realize independently regulated wired and wireless power outputs at the same time.

Figure 11:
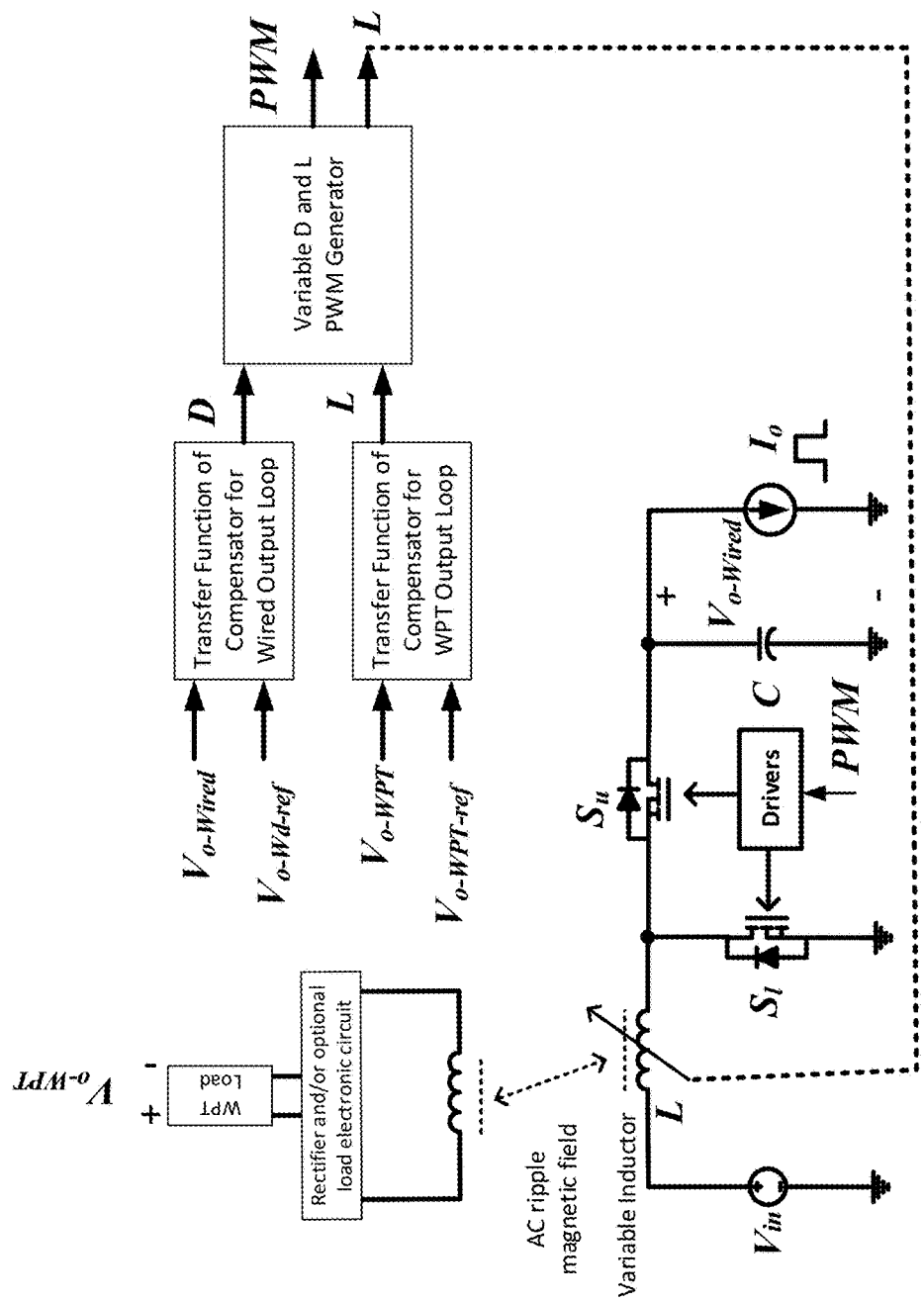
FIG. 11 illustrates another example power converter or inverter circuit according to implementations described herein.

Referring now to FIG. 11, a power converter or inverter circuit according to another implementation is shown. It should be understood that the power converter or inverter circuit of FIG. 11 shares many of the same features as the power converter or inverter circuit 100 of FIG. 2. Accordingly, some features of the power converter or inverter circuit of FIG. 11 are not described in further detail below. The power converter or inverter circuit of FIG. 11 includes a variable power inductor. As described above, the wireless power can be regulated by controlling the AC ripple component by adjusting the inductance value of the variable power inductor.

Figure 12:
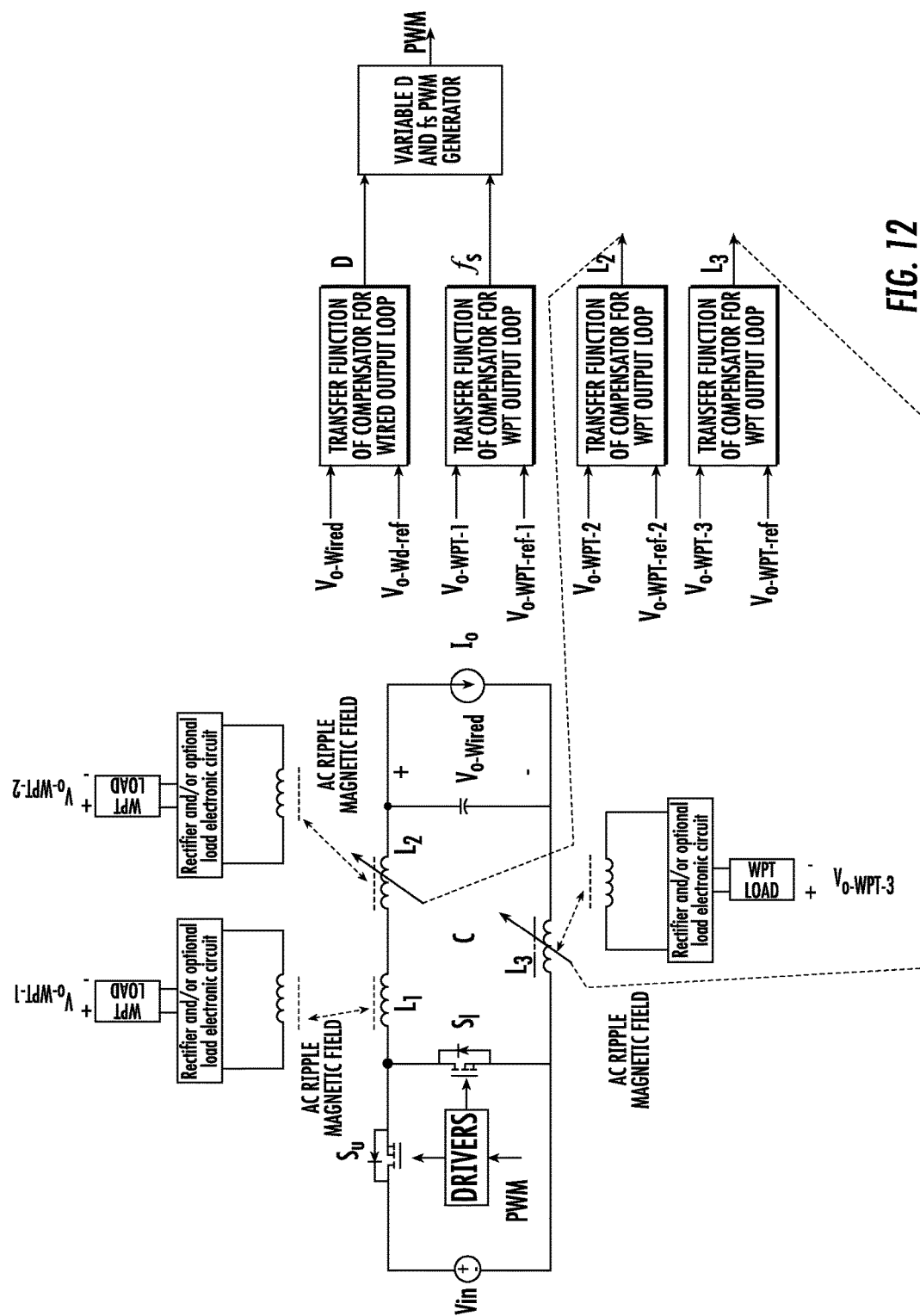
FIG. 12 illustrates a power converter or inverter circuit and a controller block diagram according to yet another implementation described herein.

It should be understood that several power outputs can be regulated independently by controlling three variables, e.g., the duty cycle, the switching frequency, and the inductors value. This is illustrated in FIG. 12, which is provided as an example only. It should be understood that the power converter or inverter circuit of FIG. 12 shares many of the same features as the power converter or inverter circuit 100 of FIG. 2. Accordingly, some features of the power converter or inverter circuit of FIG. 12 are not described in further detail below. As shown in FIG. 12, the wired power output can be regulated by adjusting the duty cycle D, the first wireless power output can be regulated by adjusting the switching frequency fs, the second wireless power output can be regulated by adjusting the inductance value of power inductor $L_2$, and the third wireless power output can be regulated by adjusting the inductance value of power inductor $L_3$.

Figure 13:
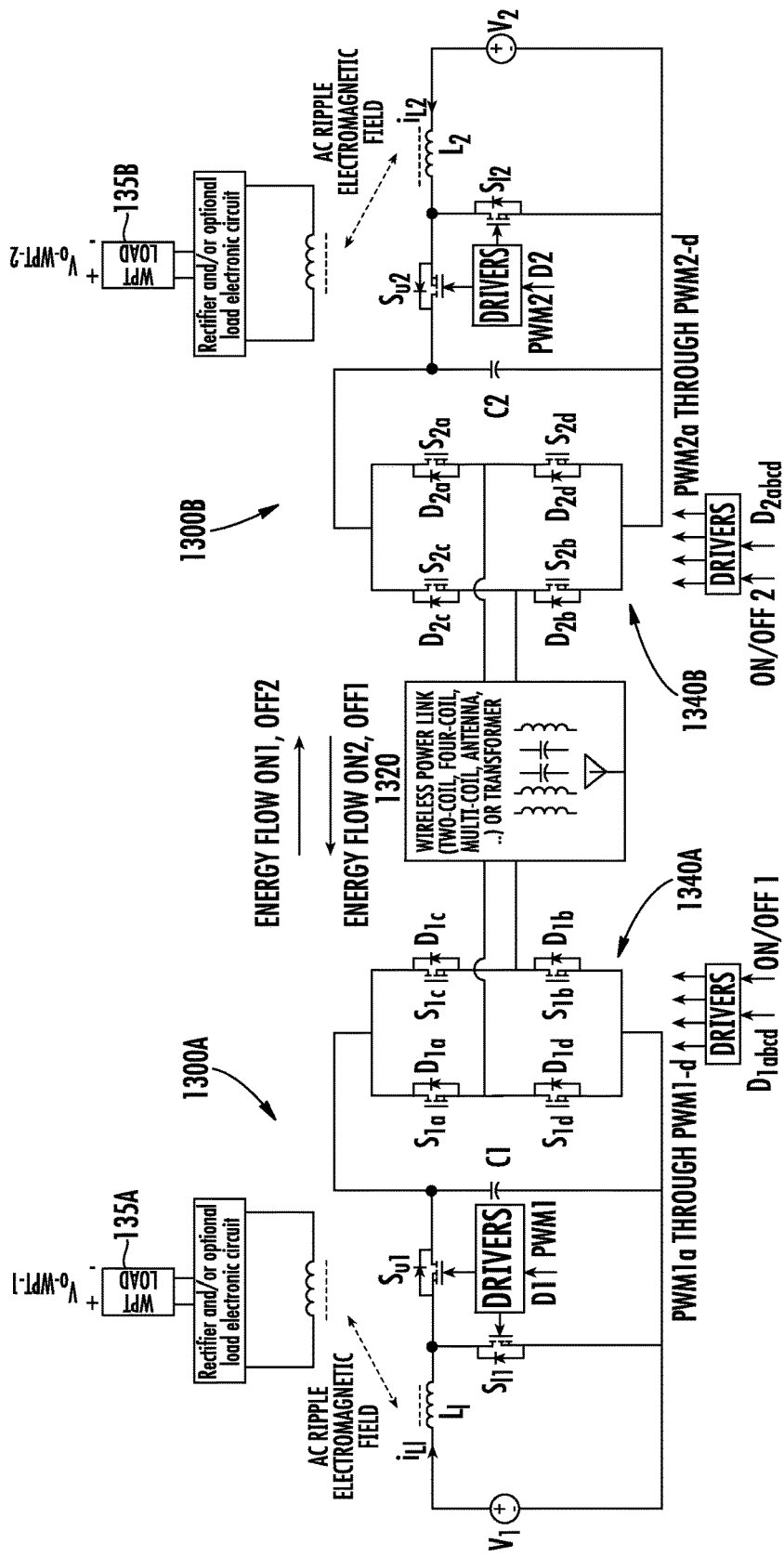
FIG. 13 illustrates an example system for simultaneous transfer of wireless and wired power according to an implementation described herein.
Figure 14:
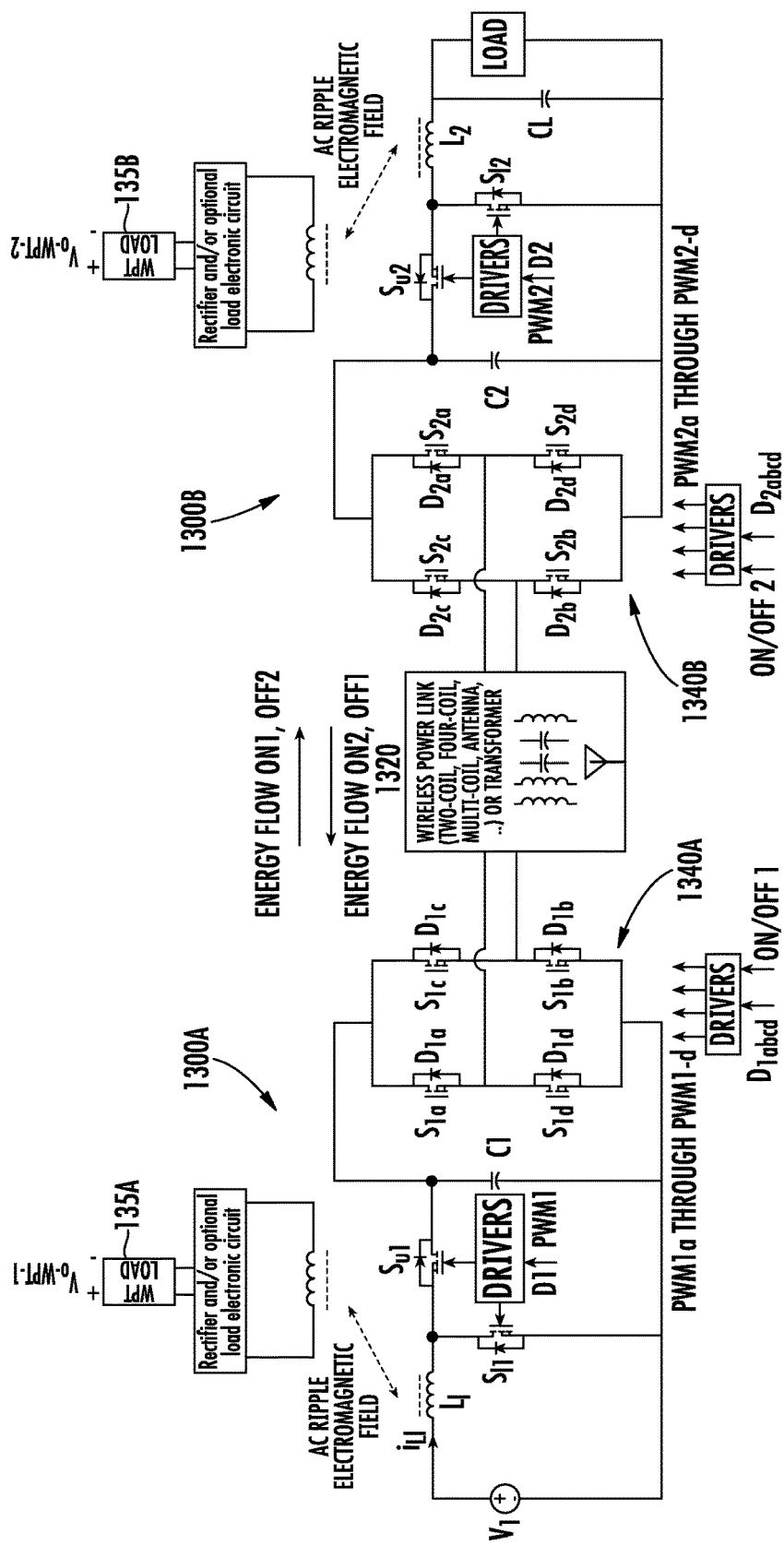
FIG. 14 illustrates another example system for simultaneous transfer of wireless and wired power according to an implementation described herein.
Figure 15:
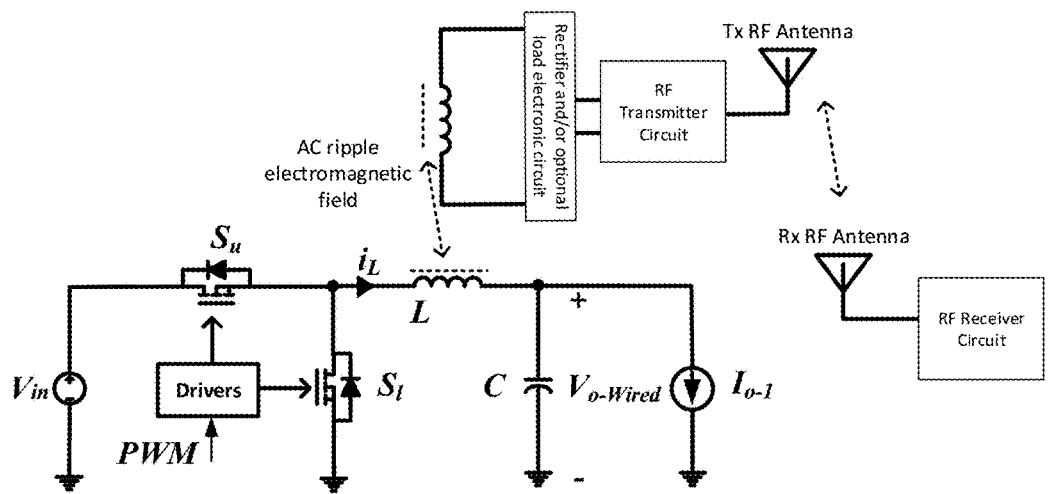
FIG. 15 illustrates a power converter or inverter circuit operably coupled to an RF transmitter circuit according to an implementation described herein.
Figure 16:
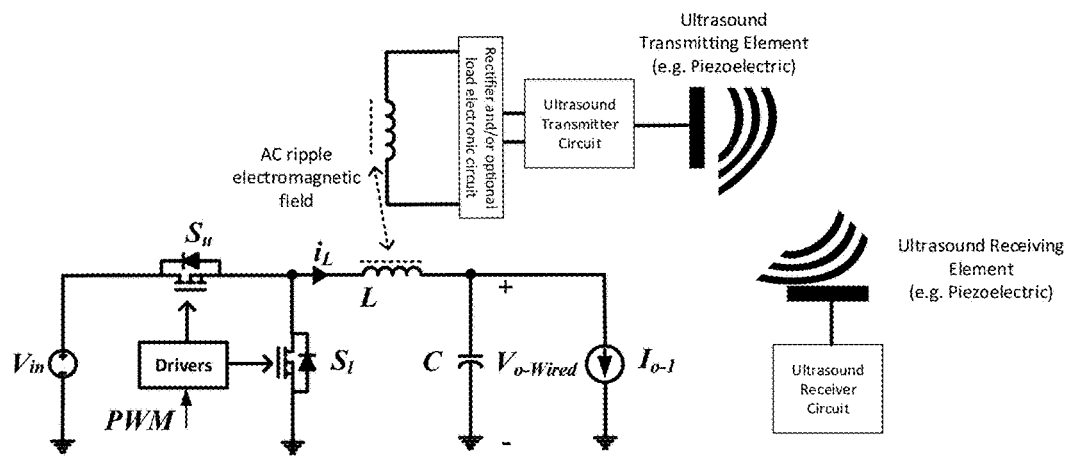
FIG. 16 illustrates a power converter or inverter circuit operably coupled to an ultrasound transmitter circuit according to an implementation described herein.
Figure 17:
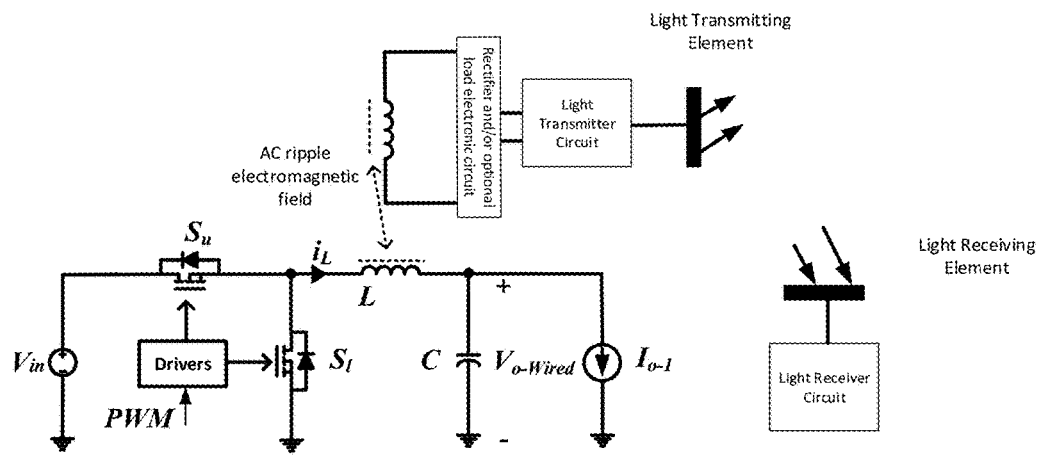
FIG. 17 illustrates a power converter or inverter circuit operably coupled to a light transmitter circuit according to an implementation described herein.
Figure 18:
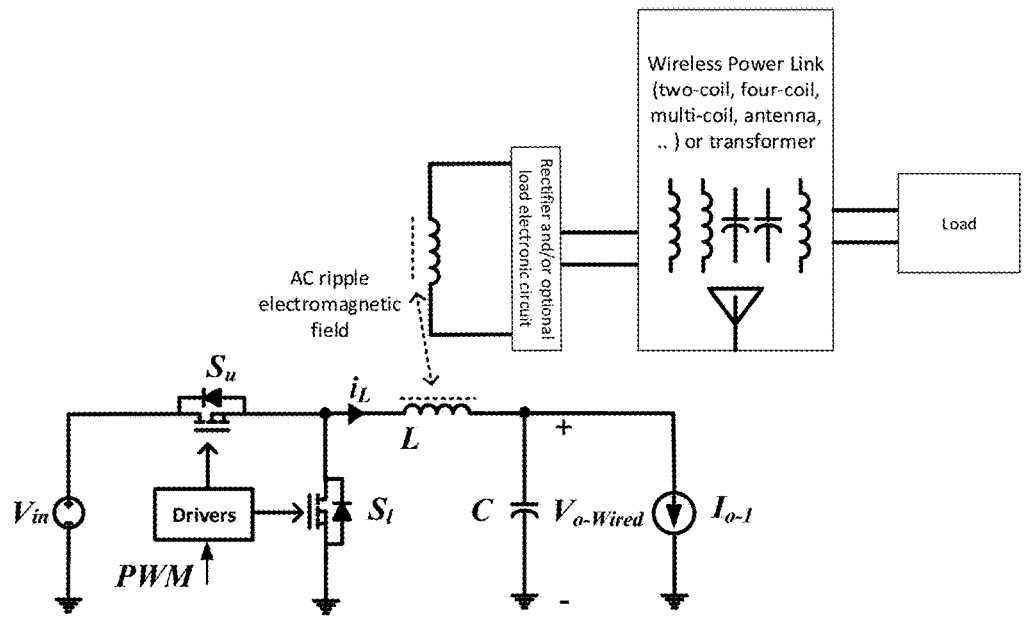
FIG. 18 illustrates a power converter or inverter circuit operably coupled to a wireless power link according to an implementation described herein.

Referring now to FIGS. 13 and 14, an example system for simultaneous transfer of wireless and wired power is described herein. The system can include a first device 1300A and a second device 1300B. The first device 1300A and the second device 1300B can optionally be mobile computing devices. Each of the first and second devices can include a power converter or inverter circuit and controller as described herein such as the power converter or inverter circuit 100 and controller 150 of FIG. 2, for example. Accordingly, some features of the power converter or inverter circuits and controllers of FIGS. 13 and 14 are not described in further detail below. The example system can also include a wireless power link 1320, where the first device 1300A and the second device 1300B are inductively coupled through the wireless power link 1320. Although wireless power link 1320 is shown as an example in FIGS. 13 and 14, it should be understood that the first device 1300A and the second device 1300B can be coupled by any type of wireless power link including, but not limited to a ultrasound wireless power link, a light wireless power link, and/or radiative RF wireless power link, among others. It should be understood that the first device 1300A and the second device 1300B can exchange wireless energy or power, which is distinct from the wireless power transmitted by each of the first device 1300A and the second device 1300B to respective wireless loads 135A and 135B. The respective wireless power delivered to each wireless load 135A or 135B can be a function of the AC ripple component of the respective current of the respective power inductor L1 or L2 of each of the first device 1300A and the second device 1300B. Additionally, each of the first device 1300A and the second device 1300B can include an active bridge circuit 1340A or 1340B operably coupled to the respective power converter or inverter circuit 100.

As described below, one or more switches of the respective active bridge circuit 1340A or 1340B can be impeded to control a bidirectional flow of wireless power between the first device 1300A and the second device 1300B through the wireless power link 1320. For example, the wireless power can flow in any direction, e.g., from the first device 1300A to the second device 1300B or from the second device 1300B to the first device 1300A, by controlling the active bridge circuits 1340A and 1340B. In one mode of operation, a power source of the first device 1300A can charge a power source of the second device 1300B. This is illustrated by FIG. 13. In another mode of operation, a power source of the second device 1300B can charge a power source of the first device 1300A. This is also illustrated by FIG. 13. In yet another mode of operation, a power source of one of the first device 1300A or the second device 1300B can supply power to a load of the other device. This is illustrated by FIG. 14. This disclosure contemplates that wireless power can be delivered through the respective wireless loads 135A and 135B regardless of the bidirectional flow of the wireless power between the first device 1300A and the second device 1300B. For example, if the left side bridge switches control is turned ON to PWM control its switches while the control of the right side bridge is turned OFF such that its diodes operate without control, the energy flow will be from left to right. On the other hand, if the right side bridge switches control is turned ON to PWM control its switches while the control of the left side bridge is turned OFF such that its diodes operate without control, the energy flow will be from right to left. If each side is part of a device such as a mobile device, one device can transfer power or charge the other device (energy exchange), depending on which side's bridge is turned ON.

As shown in FIG. 13, two active bridge circuits 1340A and 1340B are connected with wireless power link 1320, and each bridge circuit has a power converter or inverter at its side, which allows wireless power transfer to wireless loads 135A and 135B using the AC ripple based wireless power transfer described herein above. When switches $S_{1a}$-$S_{1d}$ of the active bridge circuit 1340A are turned ON (switches are PWM controlled) and switches $S_{2a}$-$S_{2d}$ of the active bridge circuit 1340B are turned OFF (switches are not PWM controlled) (i.e., which means its diodes (either external or internal to the switches) will act as a rectifier bridge), the power transfer occurs from left to right, i.e., from the first device 1300A to the second device 1300B. Thus, V1 charges or supplies power to V2. It should be understood that V1 and/or V2 can be any type of energy/power source or load. On the other hand, when switches $S_{2a}$-$S_{2d}$ of the active bridge circuit 1340B are turned ON (switches are PWM controlled) and switches $S_{1a}$-$S_{1d}$ of the active bridge circuit 1340A are turned OFF (switches are not PWM controlled) (i.e., which means its diodes (either external or internal to the switches) will act as a rectifier bridge), the power transfer occurs from right to left, i.e., from the second device 1300B to the first device 1300A. Thus, V2 charges or supplies power to V1. It should be understood that V1 and/or V2 can be any type of energy/power source or load. In both cases, both AC ripple based wireless power outputs keep receiving wireless power.

The power converter or inverter circuits at the side of each of the active bridge circuits 1340A and 1340B can be performing other functions while transferring wireless power using induced or switching AC ripple components described herein. These functions are such as battery charging, maximum power point tracking, impedance measurements, etc. Thus, each bridge side is integrated in the first device 1300A and the second device 1300B such that wireless power exchange is facilitated between the devices. For example, if the left side is integrated in a mobile phone case or a mobile phone and the right side is integrated in another mobile phone case or mobile phone, power/energy can be exchanged between the two mobile phone cases or mobile phones and with other devices or charging units. As another example, the same can be implemented with two laptop computers and between a laptop computer and a mobile phone or mobile phone case. FIG. 14 illustrates another implementation similar to FIG. 13 except with a load as opposed to a source at the side of the second device 1300B.

Referring now to FIGS. 15-18, a wireless power receiver circuit can be operably coupled to the wireless power output loop of a power converter or inverter circuit, for example, through a wireless communication link. The power converter or inverter circuit can be as described herein such as the power converter or inverter circuit 100 of FIG. 2, for example. Accordingly, features of the power converter or inverter circuit of FIGS. 15-18 are not described in further detail below. The wireless power receiver circuit can be configured to receive the wireless power and convert the wireless power to at least one of radiofrequency (RF) energy (e.g., FIG. 15), sound (e.g., FIG. 16), or light (e.g., FIG. 17). For example, the wireless power receiver circuit can include at least one of an antenna (e.g., FIG. 15), a piezoelectric element (e.g., FIG. 16), or a light-emitting element (e.g., FIG. 17). In other words, the induced or switching AC ripple energy (or both) can be converted to another energy form and transmitted then for receipt by a remote receiving device. Other energy forms are not limited to RF radiative energy, ultrasound energy, light energy, four-coil system wireless energy, and multi-coil system wireless energy, among others.

Figure 19:
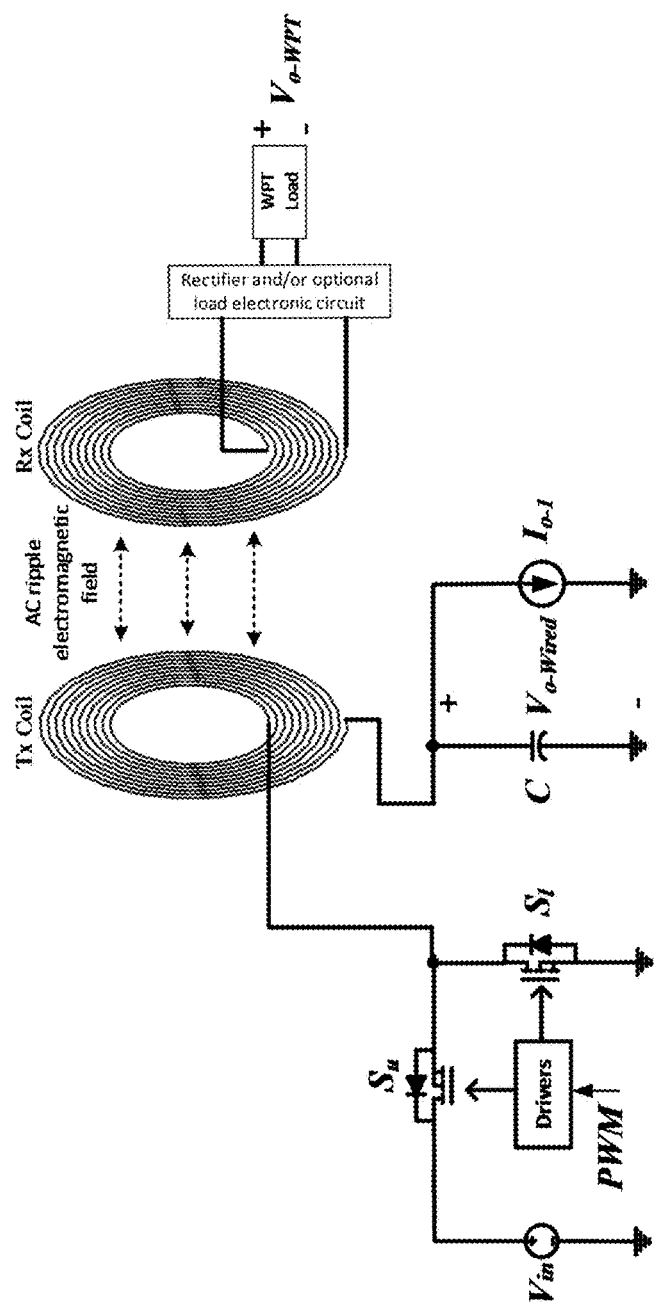
FIG. 19 illustrates an example system where the AC ripple power is transmitted via a two-coil wireless power link.
Figure 20:
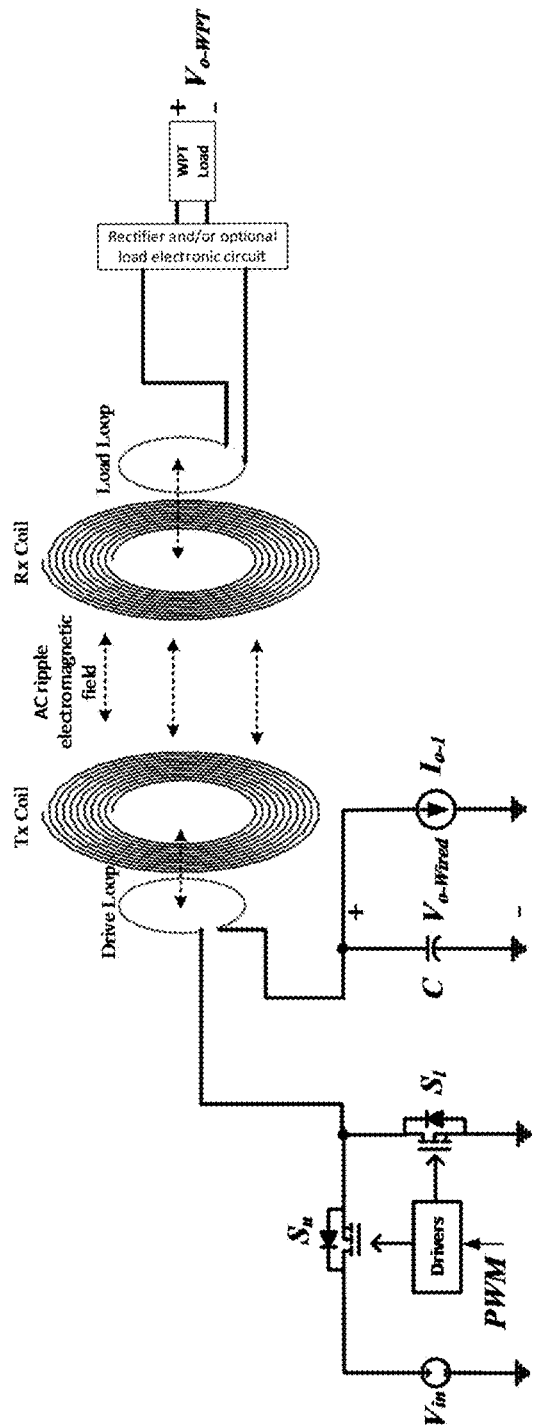
FIG. 20 illustrates an example system where the AC ripple power is transmitted via a four-coil wireless power link.
Figure 21:
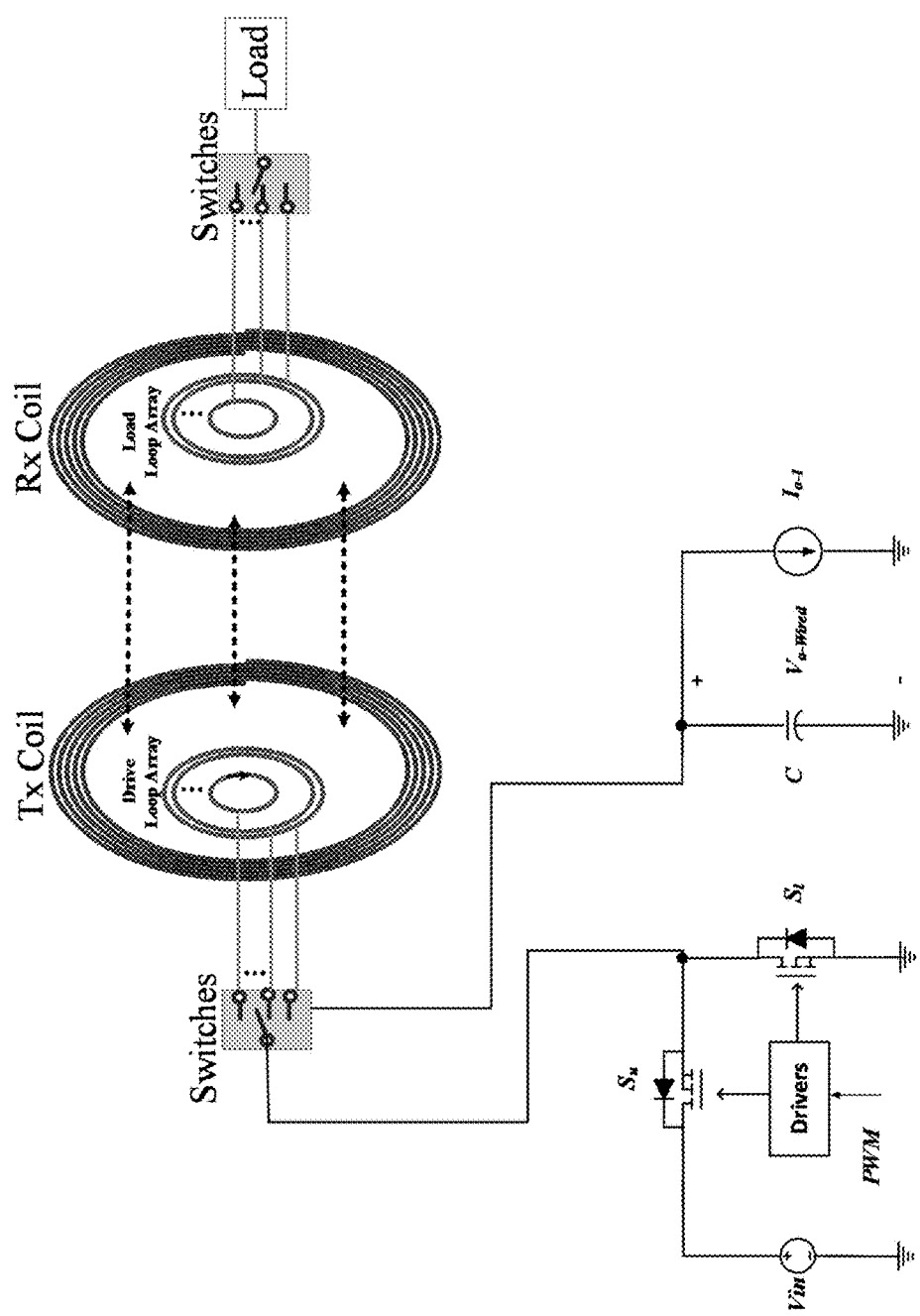
FIG. 21 illustrates an example system where the AC ripple power is transmitted via a multi-coil reconfigurable adaptive wireless power link.

Referring now to FIGS. 19-21, an antenna can be operably coupled to the wireless power output loop of a power converter or inverter circuit, for example, through one or more communication links. This disclosure contemplates the communication links are any suitable communication link. For example, a communication link may be implemented by any medium that facilitates data exchange between the antenna and the power converter or inverter circuit including, but not limited to, wired, wireless and optical links. The power converter or inverter circuit can be as described herein such as the power converter or inverter circuit 100 of FIG. 2, for example. Accordingly, features of the power converter or inverter circuit of FIGS. 19-21 are not described in further detail below.

Figure 22:
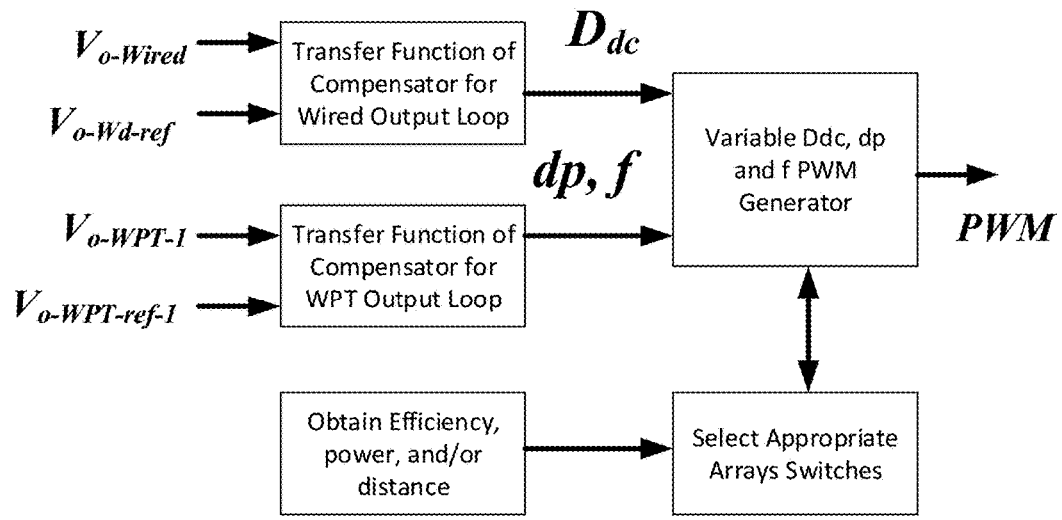
FIG. 22 illustrates a block diagram of an example controller used with the system of FIG. 21.
Figure 23:
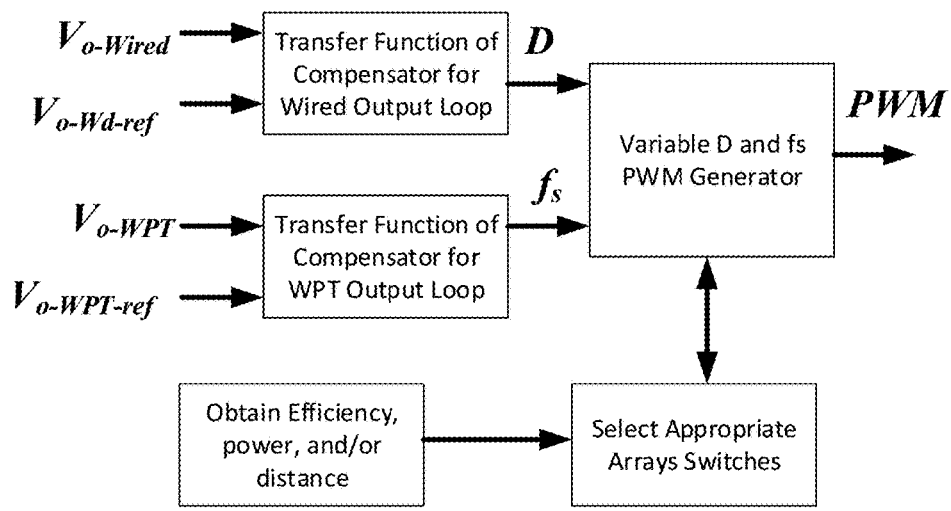
FIG. 23 illustrates another block diagram of an example controller used with the system of FIG. 21.

FIG. 19 illustrates wireless power transmission using a two-coil wireless power link. Optionally, the wireless power receiver circuit can include a multi-coil antenna. For example, FIG. 20 illustrates wireless power transmission using a four-coil wireless power link. Additionally, the controller can be configured to switch between coils of the multi-coil antenna. For example, the controller can be configured to switch between coils with different inductances and/or capacitances, which can improve wireless power transmission efficiency at different distances to, and/or misalignments, with the wireless power receiver (e.g., the wireless powered device described herein) while maintaining the regulated wired power output. It should be understood that one or more capacitors can be placed in series and/or in parallel with the inductor or coils in order to adjust the resonance frequency of the system. FIG. 21 illustrates wireless power transmission using a multi-coil reconfigurable adaptive wireless power link is used. As shown in FIG. 21, the switches can be controlled to optimize efficiency and transmission distance in addition to using duty cycle D and switching frequency fs control (or inductance value control) as described above. FIG. 22 illustrates an example block diagram for a controller implementing perturbation AC ripple based wireless power control (e.g., induced perturbation ripple technique), and FIG. 23 illustrates an example block diagram for a controller implementing switching AC ripple based wireless power control (e.g., natural switching ripple technique).

Figure 24:
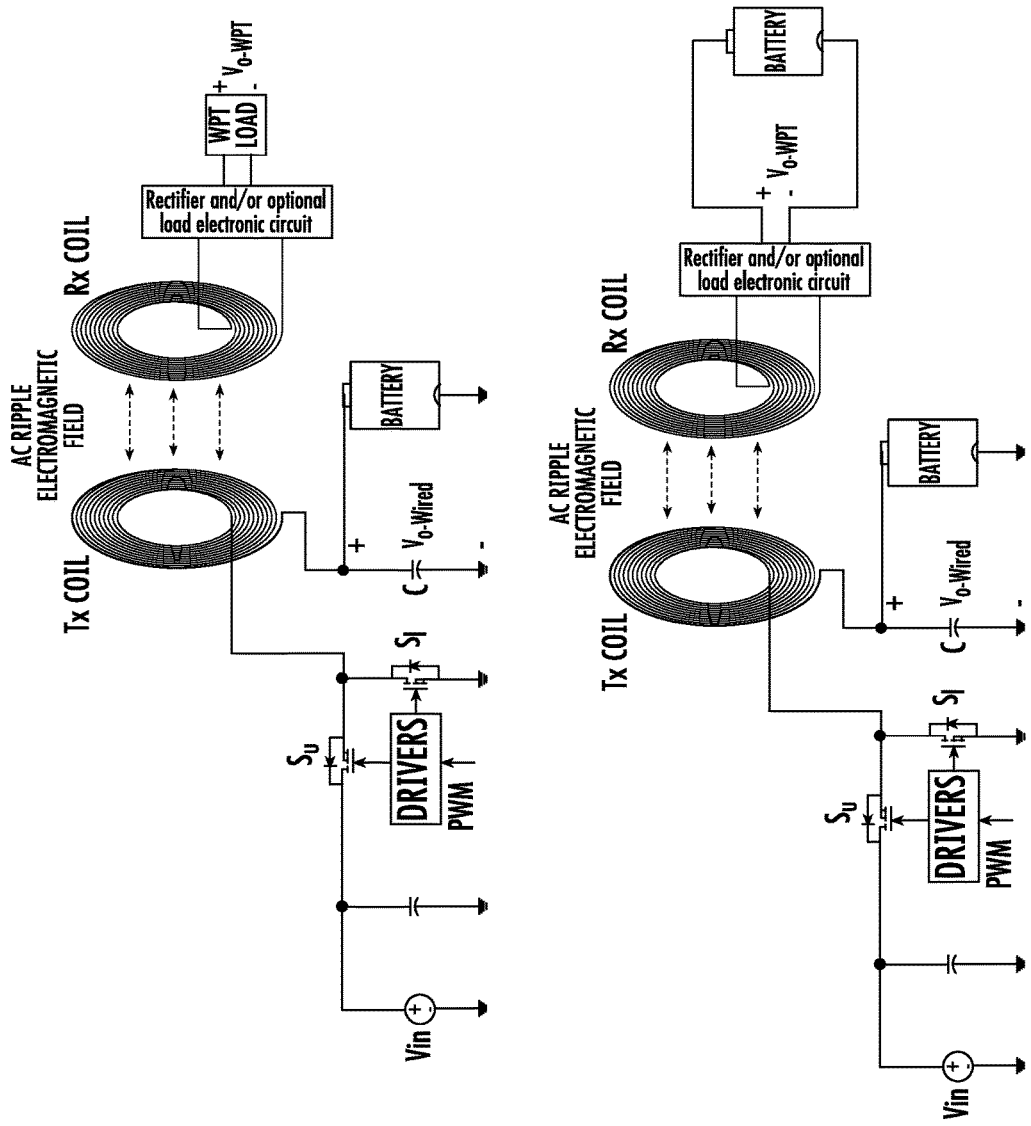
FIG. 24 illustrates example systems for charging one or more batteries at the wireless and/or wired power outputs while supplying power to another load according to implementations described herein.

Referring now to FIG. 24, example systems used to charge one or more batteries at the wireless and/or wired power outputs while supplying power to another load according to implementations described herein is shown.

Referring now to FIGS. 25-29, example devices for simultaneous transfer of wireless and wired power is shown. It should be understood that the devices of FIGS. 25-29 can include a power converter or inverter circuit and controller as described herein such as the power converter or inverter circuit 100 and controller 150 of FIG. 2, for example. Accordingly, features of the power converter or inverter circuit and controller of FIGS. 25-29 are not described in further detail below.

Figure 25:
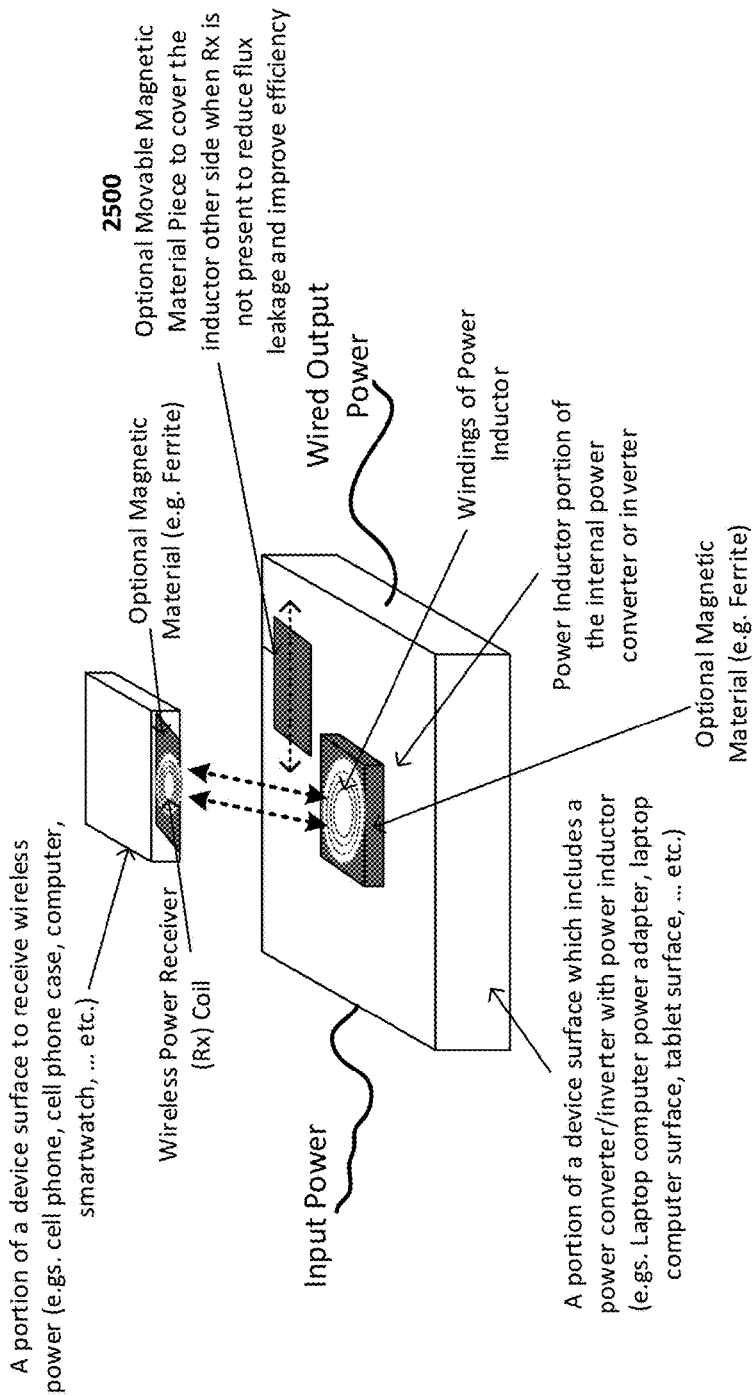
FIG. 25 illustrates an example electronic device according to implementations described herein.

As shown in FIG. 25, an electronic device which includes one or more power converter or inverter circuits with wired and wireless power outputs as described herein is shown. The device can include a housing. Additionally, the housing can have a recess or slot as shown in FIG. 25 configured to receive a power inductor shielding element 2500. The power inductor shielding element 2500 can be provided in proximity to the power inductor, for example, when the wireless power receiver (e.g., the wireless powered device described herein) is not present in order to reduce or prevent flux leakage and/or improve efficiency while reducing electromagnetic interference (EMI). A mobile device with wireless power receiver Rx receives power. When the Rx is not present, the surface of the device can be covered with material such as power inductor shielding element 2500 to reduce flux leakage from power inductor and improve its efficiency.

As shown in FIG. 26, a mobile device charger with its internal power converter that generates wired power output through USB connection is also used to transmit wireless power using the power inductor of the internal power converter is shown. Device to be wirelessly charged or powered can be placed on the charger case or nearby.

As shown in FIG. 27, a computer power adapter unit with its internal power converter that generates wired power output is also used to transmit wireless power using the power inductor of the internal power converter is shown. Device to be wirelessly charged or powered can be placed on the charger case or nearby.

As shown in FIG. 28, a computer unit with its internal power converter that generates wired power output is also used to transmit wireless power using the power inductor of the internal power converter is shown. Device to be wirelessly charged or powered can be placed on the charger case or nearby.

Figure 29:
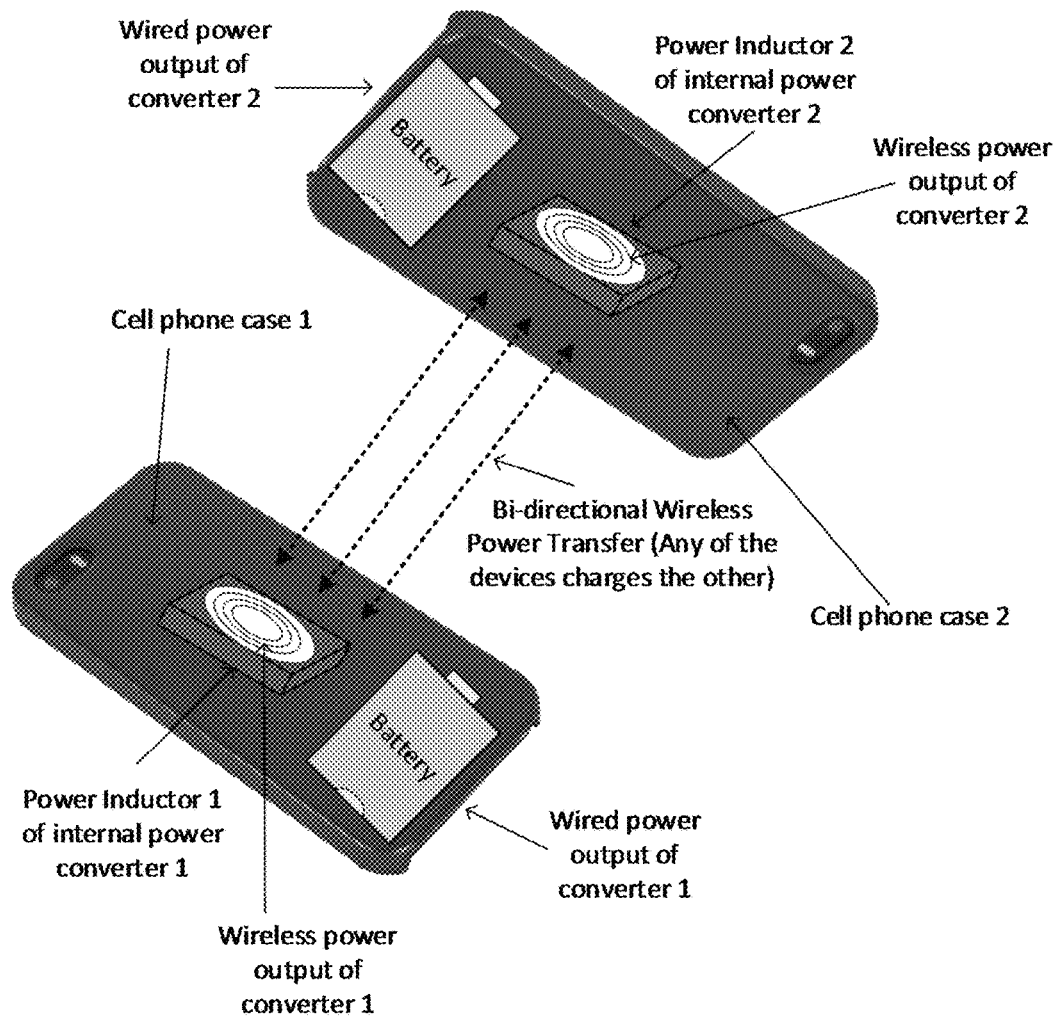
FIG. 29 illustrates an example electronic device case according to implementations described herein.

As shown in FIG. 29, a mobile or cell phone case or tablet case which have one or more power converters to charge the battery of the cell phone and/or the battery of the case with wired connections also utilize the power inductor of each converter to transmit and receive wireless power is shown. Any case can be activated to charge or power the other case.

It should be appreciated that the logical operations described herein with respect to the various figures may be implemented (1) as a sequence of computer implemented acts or program modules (i.e., software) running on a computing device (e.g., the computing device described in FIG. 30), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Referring to FIG. 30, an example computing device 3000 upon which embodiments of the invention may be implemented is illustrated. It should be understood that the example computing device 3000 is only one example of a suitable computing environment upon which embodiments of the invention may be implemented. Optionally, the computing device 3000 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 3000 typically includes at least one processing unit 3006 and system memory 3004. Depending on the exact configuration and type of computing device, system memory 3004 may be volatile (such as random access memory (RAM)), non-volatile (such as read-only memory (ROM), flash memory, etc.), or some combination of the two. This most basic configuration is illustrated in FIG. 30 by dashed line 3002. The processing unit 3006 may be a standard programmable processor that performs arithmetic and logic operations necessary for operation of the computing device 3000. The computing device 3000 may also include a bus or other communication mechanism for communicating information among various components of the computing device 3000.

Computing device 3000 may have additional features/functionality. For example, computing device 3000 may include additional storage such as removable storage 3008 and non-removable storage 3010 including, but not limited to, magnetic or optical disks or tapes. Computing device 3000 may also contain network connection(s) 3016 that allow the device to communicate with other devices. Computing device 3000 may also have input device(s) 3014 such as a keyboard, mouse, touch screen, etc. Output device(s) 3012 such as a display, speakers, printer, etc. may also be included. The additional devices may be connected to the bus in order to facilitate communication of data among the components of the computing device 3000. All these devices are well known in the art and need not be discussed at length here.

The processing unit 3006 may be configured to execute program code encoded in tangible, computer-readable media. Tangible, computer-readable media refers to any media that is capable of providing data that causes the computing device 3000 (i.e., a machine) to operate in a particular fashion. Various computer-readable media may be utilized to provide instructions to the processing unit 3006 for execution. Example tangible, computer-readable media may include, but is not limited to, volatile media, non-volatile media, removable media and non-removable media implemented in any method or technology for storage of information such as computer readable instructions, data structures, program modules or other data. System memory 3004, removable storage 3008, and non-removable storage 3010 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 3006 may execute program code stored in the system memory 3004. For example, the bus may carry data to the system memory 3004, from which the processing unit 3006 receives and executes instructions. The data received by the system memory 3004 may optionally be stored on the removable storage 3008 or the non-removable storage 3010 before or after execution by the processing unit 3006.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A device for simultaneous transfer of wireless and wired power, comprising:
    a power converter or inverter circuit comprising:
        a switch,
        a power inductor,
        a wired power output loop for delivering wired power to a wired load, wherein the wired power is a function of a direct current (DC) component of a current of the power inductor, and
        a wireless power output loop for delivering wireless power to a wireless load through an additional winding, wherein the wireless power is a function of an alternating current (AC) ripple component of the current of the power inductor; and
    a controller operably coupled to the power converter or inverter circuit, wherein the controller comprises a processing unit and a memory operably coupled to the processing unit, the memory having computer-executable instructions stored thereon that, when executed b the processing unit, cause the controller to independently regulate the wired power and the wireless power.

2. The device of claim 1, wherein the controller comprises a respective closed control loop for regulating each of the wired power and the wireless power.

3. The device of claim 1, wherein the controller is configured to independently regulate the wired power and the wireless power by altering at least one of a signal that controls a duty cycle or a switching frequency of the switch.

4. The device of claim 3, wherein the controller is configured to regulate the wireless power by perturbing a signal that controls the duty cycle of the switch, and wherein the perturbation causes a change in the AC ripple component of the current of the power inductor.

5. The device of claim 4, wherein perturbing the signal that controls the duty cycle of the switch further comprises introducing a time-varying perturbation to the signal, and wherein the controller is configured to regulate the wireless power by adjusting a peak-to-peak value or frequency of the time-varying perturbation.

6. The device of claim 3, wherein the controller is configured to regulate the wireless power by adjusting a frequency of a signal that controls the switching frequency of the switch, and wherein the adjustment causes a change in the AC ripple component of the current of the power inductor.

7. The device of claim 3, wherein the controller is configured to regulate the wired power by adjusting a signal that controls the duty cycle of the switch.

8. The device of claim 1, wherein the power converter or inverter circuit further comprises pulse width modulation (PWM) generator operably coupled to the controller, the PWM generator being configured to transmit control signals to the switch of the power converter or inverter circuit.

9. The device of claim 1, wherein the power inductor comprises a variable inductor.

10. The device of claim 9, wherein the controller is further configured to regulate the wireless power by adjusting an inductance value of the variable inductor, and wherein the adjustment causes a change in the AC ripple component of the current of the power inductor.

11. The device of claim 1, further comprising a plurality of power converter or inverter circuits, wherein respective wired power output loops or respective wireless power output loops of the power converter or inverter circuits are connected in series or parallel.

12. The device of claim 1, wherein the power converter or inverter circuit further comprises a plurality of power inductors and a plurality of wireless power output loops, each wireless power output loop being configured to deliver wireless power to a wireless load, and wherein the wireless power is a function of an AC ripple component of the current of a respective power inductor.

13. The device of claim 1, further comprising a wireless power receiver circuit operably coupled to the wireless power output loop, wherein the wireless power receiver circuit is configured to receive the wireless power and convert the wireless power to at least one of radiofrequency (RF) energy, sound, or light.

14. The device of claim 1, further comprising a power source, wherein the controller is further configured to control a bidirectional flow of the wired power or the wireless power between the power source and the wired power output loop or the wireless power output loop.

15. The device of claim 14, wherein the controller is configured to control the bidirectional flow of the wired power or the wireless power to maximize efficiency of the device or to control the bidirectional flow of the wired power or the wireless power to perform maximum power point tracking.

* * * * *